United States Patent
Burdette

(10) Patent No.: US 12,466,756 B2
(45) Date of Patent: Nov. 11, 2025

(54) CURVED GLASS ARTICLES INCLUDING A BUMPER PIECE CONFIGURED TO RELOCATE BENDING MOMENT FROM DISPLAY REGION AND METHOD OF MANUFACTURING SAME

(71) Applicant: CORNING INCORPORATED, Corning, NY (US)

(72) Inventor: Steven Roy Burdette, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 1053 days.

(21) Appl. No.: 17/065,232

(22) Filed: Oct. 7, 2020

(65) Prior Publication Data

US 2021/0101821 A1    Apr. 8, 2021

Related U.S. Application Data

(60) Provisional application No. 62/912,121, filed on Oct. 8, 2019.

(51) Int. Cl.
    *C03B 23/035*    (2006.01)
    *B32B 3/08*    (2006.01)
    (Continued)

(52) U.S. Cl.
    CPC ............ *C03B 23/0357* (2013.01); *B32B 3/08* (2013.01); *B32B 3/14* (2013.01); *B32B 7/12* (2013.01);
    (Continued)

(58) Field of Classification Search
    CPC .... B32B 3/08; B32B 3/14; B32B 7/12; B32B 2457/20; C03B 23/0357; B60R 11/0229;
    (Continued)

(56) References Cited

U.S. PATENT DOCUMENTS 2,068,030 A    1/1937    Lieser
2,608,030 A    8/1952    Jendrisak
(Continued)

FOREIGN PATENT DOCUMENTS

CN    1587132 A    3/2005
CN    1860081 A    11/2006
(Continued)

OTHER PUBLICATIONS

Japanese Patent Application No. 2019-552104, Office Action dated Jan. 12, 2023, 4 pages (English Translation only), Japanese Patent Office.

(Continued)

*Primary Examiner* — Maria V Ewald
*Assistant Examiner* — Ethan Weydemeyer
(74) *Attorney, Agent, or Firm* — Daniel J. Greenhalgh

(57) ABSTRACT

Embodiments of a curved glass article are disclosed. The article includes a glass sheet having a first major surface and a second major surface opposite to the first major surface. The second major surface defines a first curvature of the glass sheet. The article also includes a display bonded to the second major surface of the glass sheet using an optically clear adhesive. The display has a perimeter with a display edge proximal to the first curvature. The article also includes a bumper piece disposed at least along the display edge proximal to the first curvature and a frame bonded to the second surface of the glass sheet using an adhesive. The frame is disposed around the display and over the bumper piece. In the article, the adhesive has a first modulus and the bumper piece has a second modulus that is greater than the first modulus.

20 Claims, 11 Drawing Sheets

(51) Int. Cl.
  *B32B 3/14* (2006.01)
  *B32B 7/12* (2006.01)
  *B60R 11/02* (2006.01)
  *H05K 5/00* (2025.01)
  *B32B 17/06* (2006.01)
  *B60R 11/00* (2006.01)

(52) U.S. Cl.
  CPC ........... B60R 11/0229 (2013.01); *B32B 17/06* (2013.01); *B32B 2307/51* (2013.01); *B32B 2457/20* (2013.01); *B60R 2011/0005* (2013.01); *B60R 2011/0007* (2013.01); *B60R 2011/0063* (2013.01)

(58) Field of Classification Search
  CPC ..... B60R 2011/0005; B60R 2011/0007; B60R 2011/0063; H05K 5/0017
  See application file for complete search history.

(56) References Cited

U.S. PATENT DOCUMENTS

| | | |
|---|---|---|
| 3,197,903 A | 8/1965 | Walley |
| 3,338,696 A | 8/1967 | Dockerty |
| 3,582,456 A | 6/1971 | Stolki |
| 3,682,609 A | 8/1972 | Dockerty |
| 3,753,840 A | 8/1973 | Plumat |
| 3,778,335 A | 12/1973 | Boyd |
| 3,790,430 A | 2/1974 | Mochel |
| 3,799,817 A | 3/1974 | Laethem |
| 4,147,527 A | 4/1979 | Bystrov et al. |
| 4,238,265 A | 12/1980 | Deminet |
| 4,445,953 A | 5/1984 | Hawk |
| 4,455,338 A | 6/1984 | Henne |
| 4,859,636 A | 8/1989 | Aratani et al. |
| 4,899,507 A | 2/1990 | Mairlot |
| 4,969,966 A | 11/1990 | Norman |
| 4,985,099 A | 1/1991 | Mertens et al. |
| 5,108,480 A | 4/1992 | Sugiyama |
| 5,154,117 A | 10/1992 | Didelot et al. |
| 5,173,102 A | 12/1992 | Weber et al. |
| 5,245,468 A | 9/1993 | Demiryont et al. |
| 5,250,146 A | 10/1993 | Horvath |
| 5,264,058 A | 11/1993 | Hoagland et al. |
| 5,300,184 A | 4/1994 | Masunaga |
| 5,711,119 A | 1/1998 | Cornils et al. |
| 5,897,937 A | 4/1999 | Cornils et al. |
| 6,044,662 A | 4/2000 | Morin |
| 6,086,983 A | 7/2000 | Yoshizawa |
| 6,101,748 A | 8/2000 | Cass et al. |
| 6,242,931 B1 | 6/2001 | Hembree et al. |
| 6,265,054 B1 | 7/2001 | Bravet et al. |
| 6,270,605 B1 | 8/2001 | Doerfler |
| 6,274,219 B1 | 8/2001 | Schuster et al. |
| 6,287,674 B1 | 9/2001 | Verlinden et al. |
| 6,302,985 B1 | 10/2001 | Takahashi et al. |
| 6,332,690 B1 | 12/2001 | Murofushi |
| 6,387,515 B1 | 5/2002 | Joret et al. |
| 6,420,800 B1 | 7/2002 | Levesque et al. |
| 6,426,138 B1 | 7/2002 | Narushima et al. |
| 6,582,799 B1 | 6/2003 | Brown et al. |
| 6,620,365 B1 | 9/2003 | Odoi et al. |
| 6,816,225 B2 | 11/2004 | Colgan et al. |
| 6,903,871 B2 | 6/2005 | Page |
| 7,297,040 B2 | 11/2007 | Chang et al. |
| 7,375,782 B2 | 5/2008 | Yamazaki et al. |
| 7,478,930 B2 | 1/2009 | Choi |
| 7,489,303 B1 | 2/2009 | Pryor |
| 7,542,302 B1 | 6/2009 | Curnalia et al. |
| 7,750,821 B1 | 7/2010 | Taborisskiy et al. |
| 7,955,470 B2 | 6/2011 | Kapp et al. |
| 8,298,431 B2 | 10/2012 | Chwu et al. |
| 8,344,369 B2 | 1/2013 | Yamazaki et al. |
| 8,521,955 B2 | 8/2013 | Arulambalam et al. |
| 8,549,885 B2 | 10/2013 | Dannoux et al. |
| 8,586,492 B2 | 11/2013 | Barefoot et al. |
| 8,652,978 B2 | 2/2014 | Dejneka et al. |
| 8,692,787 B2 | 4/2014 | Imazeki |
| 8,702,253 B2 | 4/2014 | Lu et al. |
| 8,765,262 B2 | 7/2014 | Gross |
| 8,814,372 B2 | 8/2014 | Vandal et al. |
| 8,833,106 B2 | 9/2014 | Dannoux et al. |
| 8,912,447 B2 | 12/2014 | Leong et al. |
| 8,923,693 B2 | 12/2014 | Yeates |
| 8,962,084 B2 | 2/2015 | Brackley et al. |
| 8,967,834 B2 | 3/2015 | Timmerman et al. |
| 8,969,226 B2 | 3/2015 | Dejneka et al. |
| 8,978,418 B2 | 3/2015 | Balduin et al. |
| 9,007,226 B2 | 4/2015 | Chang |
| 9,061,934 B2 | 6/2015 | Bisson et al. |
| 9,090,501 B2 | 7/2015 | Okahata et al. |
| 9,109,881 B2 | 8/2015 | Roussev et al. |
| 9,140,543 B1 | 9/2015 | Allan et al. |
| 9,156,724 B2 | 10/2015 | Gross |
| 9,223,162 B2 | 12/2015 | Deforest et al. |
| 9,240,437 B2 | 1/2016 | Shieh et al. |
| 9,278,500 B2 | 3/2016 | Filipp |
| 9,278,655 B2 | 3/2016 | Jones et al. |
| 9,290,413 B2 | 3/2016 | Dejneka et al. |
| 9,346,703 B2 | 5/2016 | Bookbinder et al. |
| 9,346,706 B2 | 5/2016 | Bazemore et al. |
| 9,357,638 B2 | 5/2016 | Lee et al. |
| 9,442,028 B2 | 9/2016 | Roussev et al. |
| 9,446,723 B2 | 9/2016 | Stepanski |
| 9,469,561 B2 | 10/2016 | Kladias et al. |
| 9,517,967 B2 | 12/2016 | Dejneka et al. |
| 9,573,843 B2 | 2/2017 | Keegan et al. |
| 9,593,042 B2 | 3/2017 | Hu et al. |
| 9,595,960 B2 | 3/2017 | Wilford |
| 9,606,625 B2 | 3/2017 | Levesque et al. |
| 9,617,180 B2 | 4/2017 | Bookbinder et al. |
| 9,663,396 B2 | 5/2017 | Miyasaka et al. |
| 9,694,570 B2 | 7/2017 | Levasseur et al. |
| 9,700,985 B2 | 7/2017 | Kashima et al. |
| 9,701,564 B2 | 7/2017 | Bookbinder et al. |
| 9,720,450 B2 | 8/2017 | Choi et al. |
| 9,724,727 B2 | 8/2017 | Domey et al. |
| 9,802,485 B2 | 10/2017 | Masuda et al. |
| 9,815,730 B2 | 11/2017 | Marjanovic et al. |
| 9,821,509 B2 | 11/2017 | Kastell |
| 9,895,975 B2 | 2/2018 | Lee et al. |
| 9,902,640 B2 | 2/2018 | Dannoux et al. |
| 9,931,817 B2 | 4/2018 | Rickerl |
| 9,933,820 B2 | 4/2018 | Helot et al. |
| 9,947,882 B2 | 4/2018 | Zhang et al. |
| 9,955,602 B2 | 4/2018 | Wildner et al. |
| 9,957,190 B2 | 5/2018 | Finkeldey et al. |
| 9,963,374 B2 | 5/2018 | Jouanno et al. |
| 9,972,645 B2 | 5/2018 | Kim |
| 9,975,801 B2 | 5/2018 | Maschmeyer et al. |
| 9,992,888 B2 | 6/2018 | Moon et al. |
| 10,005,246 B2 | 6/2018 | Stepanski |
| 10,017,033 B2 | 7/2018 | Fisher et al. |
| 10,042,391 B2 | 8/2018 | Yun et al. |
| 10,074,824 B2 | 9/2018 | Han et al. |
| 10,086,762 B2 | 10/2018 | Uhm |
| 10,131,118 B2 | 11/2018 | Kang et al. |
| 10,140,018 B2 | 11/2018 | Kim et al. |
| 10,153,337 B2 | 12/2018 | Lee et al. |
| 10,175,802 B2 | 1/2019 | Boggs et al. |
| 10,211,416 B2 | 2/2019 | Jin et al. |
| 10,222,825 B2 | 3/2019 | Wang et al. |
| 10,273,184 B2 | 4/2019 | Garner et al. |
| 10,303,223 B2 | 5/2019 | Park et al. |
| 10,303,315 B2 | 5/2019 | Jeong et al. |
| 10,326,101 B2 | 6/2019 | Oh et al. |
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |

(56) References Cited

U.S. PATENT DOCUMENTS

| | | | |
|---|---|---|---|
| 10,500,958 B2 | 12/2019 | Cho et al. | |
| 10,606,395 B2 | 3/2020 | Boggs et al. | |
| 10,649,267 B2 | 5/2020 | Tuan et al. | |
| 10,788,707 B2 | 9/2020 | Ai et al. | |
| 10,976,607 B2 | 4/2021 | Huang et al. | |
| 2002/0039229 A1 | 4/2002 | Hirose et al. | |
| 2003/0211329 A1* | 11/2003 | Fox | B05D 7/54 428/416 |
| 2004/0026021 A1 | 2/2004 | Groh et al. | |
| 2004/0069770 A1 | 4/2004 | Cary et al. | |
| 2004/0107731 A1 | 6/2004 | Doehring et al. | |
| 2004/0258929 A1 | 12/2004 | Glaubitt et al. | |
| 2005/0178158 A1 | 8/2005 | Moulding et al. | |
| 2006/0227125 A1 | 10/2006 | Wong et al. | |
| 2007/0188871 A1 | 8/2007 | Fleury et al. | |
| 2007/0195419 A1 | 8/2007 | Tsuda et al. | |
| 2007/0210621 A1 | 9/2007 | Barton et al. | |
| 2007/0221313 A1 | 9/2007 | Franck et al. | |
| 2007/0223121 A1 | 9/2007 | Franck et al. | |
| 2007/0291384 A1 | 12/2007 | Wang | |
| 2008/0031991 A1 | 2/2008 | Choi et al. | |
| 2008/0093753 A1 | 4/2008 | Schuetz | |
| 2008/0285134 A1 | 11/2008 | Closset et al. | |
| 2008/0303976 A1 | 12/2008 | Nishizawa et al. | |
| 2009/0096937 A1 | 4/2009 | Bauer et al. | |
| 2009/0101208 A1 | 4/2009 | Vandal et al. | |
| 2009/0117332 A1 | 5/2009 | Ellsworth et al. | |
| 2009/0179840 A1 | 7/2009 | Tanaka et al. | |
| 2009/0185127 A1 | 7/2009 | Tanaka et al. | |
| 2009/0201443 A1 | 8/2009 | Sasaki et al. | |
| 2009/0311497 A1 | 12/2009 | Aoki | |
| 2010/0000259 A1 | 1/2010 | Ukrainczyk et al. | |
| 2010/0031590 A1 | 2/2010 | Buchwald et al. | |
| 2010/0065342 A1 | 3/2010 | Shaikh | |
| 2010/0103138 A1 | 4/2010 | Huang et al. | |
| 2010/0182143 A1 | 7/2010 | Lynam | |
| 2010/0245253 A1 | 9/2010 | Rhyu et al. | |
| 2011/0057465 A1 | 3/2011 | Beau et al. | |
| 2011/0072961 A1* | 3/2011 | Jungkuist | F41H 5/0407 89/905 |
| 2011/0148267 A1 | 6/2011 | Mcdaniel et al. | |
| 2012/0050975 A1 | 3/2012 | Garelli et al. | |
| 2012/0111056 A1 | 5/2012 | Prest | |
| 2012/0128952 A1 | 5/2012 | Miwa et al. | |
| 2012/0134025 A1 | 5/2012 | Hart | |
| 2012/0144866 A1 | 6/2012 | Liu et al. | |
| 2012/0152897 A1 | 6/2012 | Cheng et al. | |
| 2012/0196110 A1 | 8/2012 | Murata et al. | |
| 2012/0202030 A1 | 8/2012 | Kondo et al. | |
| 2012/0218640 A1 | 8/2012 | Gollier et al. | |
| 2012/0263945 A1 | 10/2012 | Yoshikawa | |
| 2012/0280368 A1 | 11/2012 | Garner et al. | |
| 2012/0320509 A1 | 12/2012 | Kim et al. | |
| 2013/0020007 A1 | 1/2013 | Niiyama et al. | |
| 2013/0033885 A1 | 2/2013 | Oh et al. | |
| 2013/0070340 A1 | 3/2013 | Shelestak et al. | |
| 2013/0081428 A1 | 4/2013 | Liu et al. | |
| 2013/0088441 A1 | 4/2013 | Chung et al. | |
| 2013/0120850 A1 | 5/2013 | Lambert et al. | |
| 2013/0186141 A1 | 7/2013 | Henry | |
| 2013/0209824 A1 | 8/2013 | Sun et al. | |
| 2013/0279188 A1 | 10/2013 | Entenmann et al. | |
| 2013/0314642 A1 | 11/2013 | Timmerman et al. | |
| 2013/0329346 A1 | 12/2013 | Dannoux et al. | |
| 2013/0330495 A1 | 12/2013 | Maatta et al. | |
| 2014/0014260 A1 | 1/2014 | Chowdhury et al. | |
| 2014/0036428 A1 | 2/2014 | Seng et al. | |
| 2014/0065374 A1 | 3/2014 | Tsuchiya et al. | |
| 2014/0141206 A1 | 5/2014 | Gillard et al. | |
| 2014/0146538 A1 | 5/2014 | Zenker et al. | |
| 2014/0153234 A1 | 6/2014 | Knoche et al. | |
| 2014/0153894 A1 | 6/2014 | Jenkins et al. | |
| 2014/0168153 A1 | 6/2014 | Deichmann et al. | |
| 2014/0168546 A1 | 6/2014 | Magnusson et al. | |
| 2014/0234581 A1 | 8/2014 | Immerman et al. | |
| 2014/0308464 A1 | 10/2014 | Levasseur et al. | |
| 2014/0312518 A1 | 10/2014 | Levasseur et al. | |
| 2014/0333848 A1 | 11/2014 | Chen | |
| 2014/0340609 A1 | 11/2014 | Taylor et al. | |
| 2015/0015807 A1 | 1/2015 | Franke et al. | |
| 2015/0072129 A1 | 3/2015 | Okahata et al. | |
| 2015/0077429 A1 | 3/2015 | Eguchi et al. | |
| 2015/0166394 A1 | 6/2015 | Marjanovic et al. | |
| 2015/0168768 A1 | 6/2015 | Nagatani | |
| 2015/0177443 A1 | 6/2015 | Faecke et al. | |
| 2015/0210588 A1 | 7/2015 | Chang et al. | |
| 2015/0246424 A1 | 9/2015 | Venkatachalam et al. | |
| 2015/0246507 A1 | 9/2015 | Brown et al. | |
| 2015/0274585 A1 | 10/2015 | Rogers et al. | |
| 2015/0322270 A1 | 11/2015 | Amin et al. | |
| 2015/0336357 A1 | 11/2015 | Kang et al. | |
| 2015/0351272 A1 | 12/2015 | Wildner et al. | |
| 2015/0357387 A1 | 12/2015 | Lee et al. | |
| 2016/0009066 A1 | 1/2016 | Nieber et al. | |
| 2016/0009068 A1 | 1/2016 | Garner | |
| 2016/0016849 A1 | 1/2016 | Allan | |
| 2016/0039705 A1 | 2/2016 | Kato et al. | |
| 2016/0052241 A1 | 2/2016 | Zhang | |
| 2016/0066463 A1 | 3/2016 | Yang et al. | |
| 2016/0081204 A1 | 3/2016 | Park et al. | |
| 2016/0083282 A1 | 3/2016 | Jouanno et al. | |
| 2016/0083292 A1 | 3/2016 | Tabe et al. | |
| 2016/0091645 A1 | 3/2016 | Birman et al. | |
| 2016/0102015 A1 | 4/2016 | Yasuda et al. | |
| 2016/0113135 A1 | 4/2016 | Kim et al. | |
| 2016/0207290 A1 | 7/2016 | Cleary et al. | |
| 2016/0214889 A1 | 7/2016 | Garner et al. | |
| 2016/0216434 A1 | 7/2016 | Shih et al. | |
| 2016/0250982 A1 | 9/2016 | Fisher et al. | |
| 2016/0252656 A1 | 9/2016 | Waldschmidt et al. | |
| 2016/0259365 A1 | 9/2016 | Wang et al. | |
| 2016/0272529 A1 | 9/2016 | Hong et al. | |
| 2016/0297176 A1 | 10/2016 | Rickerl | |
| 2016/0306451 A1 | 10/2016 | Soda et al. | |
| 2016/0313494 A1 | 10/2016 | Hamilton et al. | |
| 2016/0354996 A1 | 12/2016 | Alder et al. | |
| 2016/0355091 A1 | 12/2016 | Lee et al. | |
| 2016/0355901 A1 | 12/2016 | Isozaki et al. | |
| 2016/0375808 A1 | 12/2016 | Etienne et al. | |
| 2017/0008377 A1 | 1/2017 | Fisher et al. | |
| 2017/0021661 A1 | 1/2017 | Pelucchi | |
| 2017/0066223 A1 | 3/2017 | Notsu et al. | |
| 2017/0081238 A1 | 3/2017 | Jones et al. | |
| 2017/0088454 A1 | 3/2017 | Fukushima et al. | |
| 2017/0094039 A1 | 3/2017 | Lu | |
| 2017/0115944 A1 | 4/2017 | Oh et al. | |
| 2017/0158551 A1 | 6/2017 | Bookbinder et al. | |
| 2017/0160434 A1 | 6/2017 | Hart et al. | |
| 2017/0185289 A1 | 6/2017 | Kim et al. | |
| 2017/0190152 A1 | 7/2017 | Notsu et al. | |
| 2017/0197561 A1 | 7/2017 | Mcfarland | |
| 2017/0213872 A1 | 7/2017 | Jinbo et al. | |
| 2017/0217290 A1 | 8/2017 | Yoshizumi et al. | |
| 2017/0217815 A1 | 8/2017 | Dannoux et al. | |
| 2017/0240772 A1 | 8/2017 | Dohner et al. | |
| 2017/0247291 A1 | 8/2017 | Hatano et al. | |
| 2017/0262057 A1 | 9/2017 | Knittl et al. | |
| 2017/0263690 A1 | 9/2017 | Lee et al. | |
| 2017/0274627 A1 | 9/2017 | Chang et al. | |
| 2017/0285227 A1 | 10/2017 | Chen et al. | |
| 2017/0305786 A1 | 10/2017 | Roussev et al. | |
| 2017/0327402 A1 | 11/2017 | Fujii et al. | |
| 2017/0334770 A1 | 11/2017 | Luzzato et al. | |
| 2017/0349473 A1 | 12/2017 | Moriya et al. | |
| 2018/0009197 A1 | 1/2018 | Gross et al. | |
| 2018/0014420 A1 | 1/2018 | Amin et al. | |
| 2018/0031743 A1 | 2/2018 | Wakatsuki et al. | |
| 2018/0050948 A1* | 2/2018 | Faik | B60K 37/06 |
| 2018/0069053 A1 | 3/2018 | Bok | |
| 2018/0072022 A1 | 3/2018 | Tsai et al. | |
| 2018/0103132 A1 | 4/2018 | Prushinskiy et al. | |
| 2018/0111569 A1 | 4/2018 | Faik et al. | |
| 2018/0122863 A1 | 5/2018 | Bok | |
| 2018/0125228 A1 | 5/2018 | Porter et al. | |

(56) References Cited

U.S. PATENT DOCUMENTS

| | | | |
|---|---|---|---|
| 2018/0134232 A1 | 5/2018 | Jacques | |
| 2018/0141850 A1 | 5/2018 | Dejneka et al. | |
| 2018/0147985 A1 | 5/2018 | Brown et al. | |
| 2018/0149777 A1 | 5/2018 | Brown | |
| 2018/0149907 A1 | 5/2018 | Gahagan et al. | |
| 2018/0164850 A1 | 6/2018 | Sim et al. | |
| 2018/0186674 A1 | 7/2018 | Kumar et al. | |
| 2018/0188869 A1 | 7/2018 | Boggs et al. | |
| 2018/0208131 A1 | 7/2018 | Mattelet et al. | |
| 2018/0208494 A1 | 7/2018 | Mattelet et al. | |
| 2018/0210118 A1 | 7/2018 | Gollier et al. | |
| 2018/0215125 A1 | 8/2018 | Gahagan | |
| 2018/0245125 A1 | 8/2018 | Tsai et al. | |
| 2018/0304825 A1 | 10/2018 | Mattelet et al. | |
| 2018/0324964 A1 | 11/2018 | Yoo et al. | |
| 2018/0341132 A1* | 11/2018 | Suzuki | G02F 1/1347 |
| 2018/0345644 A1 | 12/2018 | Kang et al. | |
| 2018/0364760 A1 | 12/2018 | Ahn et al. | |
| 2018/0374906 A1 | 12/2018 | Everaerts et al. | |
| 2019/0034017 A1 | 1/2019 | Boggs et al. | |
| 2019/0039352 A1 | 2/2019 | Zhao et al. | |
| 2019/0039935 A1 | 2/2019 | Couillard et al. | |
| 2019/0069451 A1 | 2/2019 | Myers et al. | |
| 2019/0077337 A1 | 3/2019 | Gervelmeyer | |
| 2019/0152831 A1 | 5/2019 | An et al. | |
| 2019/0223309 A1 | 7/2019 | Amin et al. | |
| 2019/0295494 A1 | 9/2019 | Wang et al. | |
| 2019/0315648 A1 | 10/2019 | Kumar et al. | |
| 2019/0329531 A1 | 10/2019 | Brennan et al. | |
| 2020/0064535 A1 | 2/2020 | Haan et al. | |
| 2020/0301192 A1 | 9/2020 | Huang et al. | |
| 2021/0055599 A1 | 2/2021 | Chen et al. | |

FOREIGN PATENT DOCUMENTS

| | | |
|---|---|---|
| CN | 101600846 A | 12/2009 |
| CN | 101684032 A | 3/2010 |
| CN | 201989544 U | 9/2011 |
| CN | 102341356 A | 2/2012 |
| CN | 102464456 A | 5/2012 |
| CN | 102566841 A | 7/2012 |
| CN | 103136490 A | 6/2013 |
| CN | 103587161 A | 2/2014 |
| CN | 203825589 U | 9/2014 |
| CN | 204111583 U | 1/2015 |
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009921938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3426614 A1 | 1/2019 |
| EP | 3532442 A1 | 9/2019 |
| FR | 2750075 A1 | 12/1997 |
| FR | 2918411 A1 | 1/2009 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 A | 3/1982 |
| JP | 58-073681 A | 5/1983 |
| JP | 58-194751 | 11/1983 |
| JP | 59-076561 A | 5/1984 |
| JP | 63-089317 A | 4/1988 |
| JP | 63-190730 | 8/1988 |
| JP | 3059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2013-099821 A | 5/2013 |
| JP | 2013-188993 A | 9/2013 |
| JP | 2014-126564 A | 7/2014 |
| JP | 2015-502901 A | 1/2015 |
| JP | 2015-092422 A | 5/2015 |
| JP | 5748082 B2 | 7/2015 |
| JP | 5796561 B2 | 10/2015 |
| JP | 2016-500458 A | 1/2016 |
| JP | 2016-031696 A | 3/2016 |
| JP | 2016-517380 A | 6/2016 |
| JP | 2016-130810 A | 7/2016 |
| JP | 2016-144008 A | 8/2016 |
| JP | 5976561 B2 | 8/2016 |
| JP | 2016-173794 A | 9/2016 |
| JP | 2016-530204 A | 9/2016 |

(56) References Cited

FOREIGN PATENT DOCUMENTS

| | | |
|---|---|---|
| JP | 2016-203609 A | 12/2016 |
| JP | 2016-207200 A | 12/2016 |
| JP | 2017-026694 A | 2/2017 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 98/01649 A1 | 1/1998 |
| WO | 00/73062 A1 | 12/2000 |
| WO | 2006/095005 A1 | 9/2006 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/045809 A1 | 3/2014 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016/027812 A1 | 2/2016 |
| WO | 2016/028580 A1 | 2/2016 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/155932 A1 | 9/2017 |
| WO | 2017/158031 A1 | 9/2017 |
| WO | 2018/005646 A1 | 1/2018 |
| WO | 2018/009504 A1 | 1/2018 |
| WO | 2018/015392 A1 | 1/2018 |
| WO | WO-2018075853 A1 * 4/2018 ....... B29C 66/81463 |
| WO | 2018/081068 A1 | 5/2018 |
| WO | 2018/102332 A1 | 6/2018 |
| WO | 2018/125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

Author Unknown; "Stress Optics Laboratory Practice Guide" 2012; 11 Pages.

Belis et al; "Cold Bending of Laminated Glass Panels"; Heron vol. 52 (2007) No. 1/2; 24 Pages.

Doyle et al; "Manual on Experimental Stress Analysis"; Fifth Edition, Society for Experimental Mechanics; Unknown Year; 31 Pages.

Elziere; "Laminated Glass: Dynamic Rupture of Adhesion"; Polymers; Universite Pierre et Marie Curie—Paris VI, 2016. English; 181 Pages.

Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.

Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.

Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), TU Delft, Jun. 2012; 13 Pages.

Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.

Fildhuth; "Design and Monitoring of Cold Bent Lamination—Stabilised Glass"; ITKE 39 (2015) 270 Pages.

Galuppi et al; "Cold-Lamination-Bending of Glass: Sinusoidal is Better Than Circular", Composites Part B 79 (2015) 285-300.

Galuppi et al; "Optical Cold Bending of Laminated Glass"; Internaitonal Journal of Solids and Structures, 67-68 (2015) pp. 231-243.

Millard; "Bending Glass in the Parametric Age"; Enclos; (2015); pp. 1-6; http://www.enclos.com/site-info/news/bending-glass-in-the-parametric-age.

Neugebauer et al; "Let Thin Glass in the Faade Move Thin Glass-New Possibilities for Glass in the Faade", Conference Paper Jun. 2018; 12 Pages.

Vakar et al; "Cold Bendable, Laminated Glass—New Possibilities in Design"; Structural Engineering International, Feb. 2004 pp. 95-97.

Weijde; "Graduation Plan"; Jan. 2017; 30 Pages.

(56) References Cited

OTHER PUBLICATIONS

Werner; "Display Materials and Processes," Information Display; May 2015; 8 Pages.
"Stainless Steel—Grade 410 (UNS S41000)", available online at <https://www.azom.com/article.aspx?ArticleID=970>, Oct. 23, 2001, 5 pages.
"Standard Test Method for Measurement of Glass Stress—Optical Coefficient", ASTM International, Designation: C770-16, 2016.
Ashley Klamer, "Dead front overlays", Marking Systems, Inc., Jul. 8, 2013, 2 pages.
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
ASTM Standard C770-98 (2013), "Standard Test Method for Measurement of Glass Stress-Optical Coefficient".
Burchardt et al., (Editorial Team), Elastic Bonding: The basic principles of adhesive technology and a guide to its cost-effective use in industry, 2006, 71 pages.
Byun et al; "A Novel Route for Thinning of LCD Glass Substrates"; SID 06 Digest; pp. 1786-1788, v37, 2006.
Datsiou et al., "Behaviour of cold bent glass plates during the shaping process", Engineered Transparency. International Conference atglasstec, Dusseldorf, Germany, Oct. 21 and 22, 2014, 9 pages.
Engineering ToolBox, "Coefficients of Linear Thermal Expansion", available online at <https://www.engineeringtoolbox.com/linear-expansion-coefficients-d_95.html>, 2003, 9 pages.
Fauercia "Intuitive HMI for a Smart Life on Board" (2018); 8 Pages http://www.faurecia.com/en/innovation/smart-life-board/intuitive-HMI.
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].
Ferwerda et al., "Perception of sparkle in anti-glare display screens", Journal of the SID, vol. 22, Issue 2, 2014, pp. 129-136.
Galuppi et al; "Buckling Phenomena in Double Curved Cold-Bent Glass;" Intl. J. Non-Linear Mechanics 64 (2014) pp. 70-84.
Galuppi et al; "Large Deformations and Snap-Through Instability of Cold-Bent Glass"; Challenging Glass 4 & Cost Action TU0905 Final Conference; (2014) pp. 681-689.
Galuppi L et al: "Optimal cold bending of laminated glass", 20070101 vol. 52, No. 1/2 Jan. 1, 2007 (Jan. 1, 2007), pp. 123-146.
Gollier et al., "Display Sparkle Measurement and Human Response", SID Symposium Digest of Technical Papers, vol. 44, Issue 1, 2013, pp. 295-297.
Indian Patent Application No. 201917031293 Office Action dated May 24, 2021; 6 pages; Indian Patent Office.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.
Pambianchi et al; "Corning Incorporated: Designing a New Future With Glass and Optics"; Chapter 1 in "Materials Research for Manufacturing: an Industrial Perspective of Turning Materials Into New Products"; Springer Series Material Science 224, p. 12 (2016).
Pegatron Corp. "Pegaton Navigate the Future"; Ecockpit/Center Cnsole Work Premiere; Automotive World; Downloaded Jul. 12, 2017; 2 Pages.
Photodon, "Screen Protectors For Your Car's Navi System That You're Gonna Love", photodon.com, Nov. 6, 2015, https://www.photodon.com/blog/archives/screen-protectors-for-your-cars-navi-system-that-youre-gonna-love) (Year. 2015).
Product Information Sheet: Coming® Gorilla® Glass 3 with Native Damage Resistance™, Coming Incorporated, 2015, Rev: F_090315, 2 pages.
Scholze, H., "Glass-Water Interactions", Journal of Non-Crystalline Solids vol. 102, Issues 1-3, Jun. 1, 1988, pp. 1-10.
Stattler; "New Wave-Curved Glass Shapes Design"; Glass Magazine; (2013); 2 Pages.
Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Zhixin Wang, Polydimethylsiloxane mechanical properties measured by macroscopic compression and nanoindentation techniques, Graduate Theses and Dissertations, University of South Florida, 2011, 79 pages.

* cited by examiner

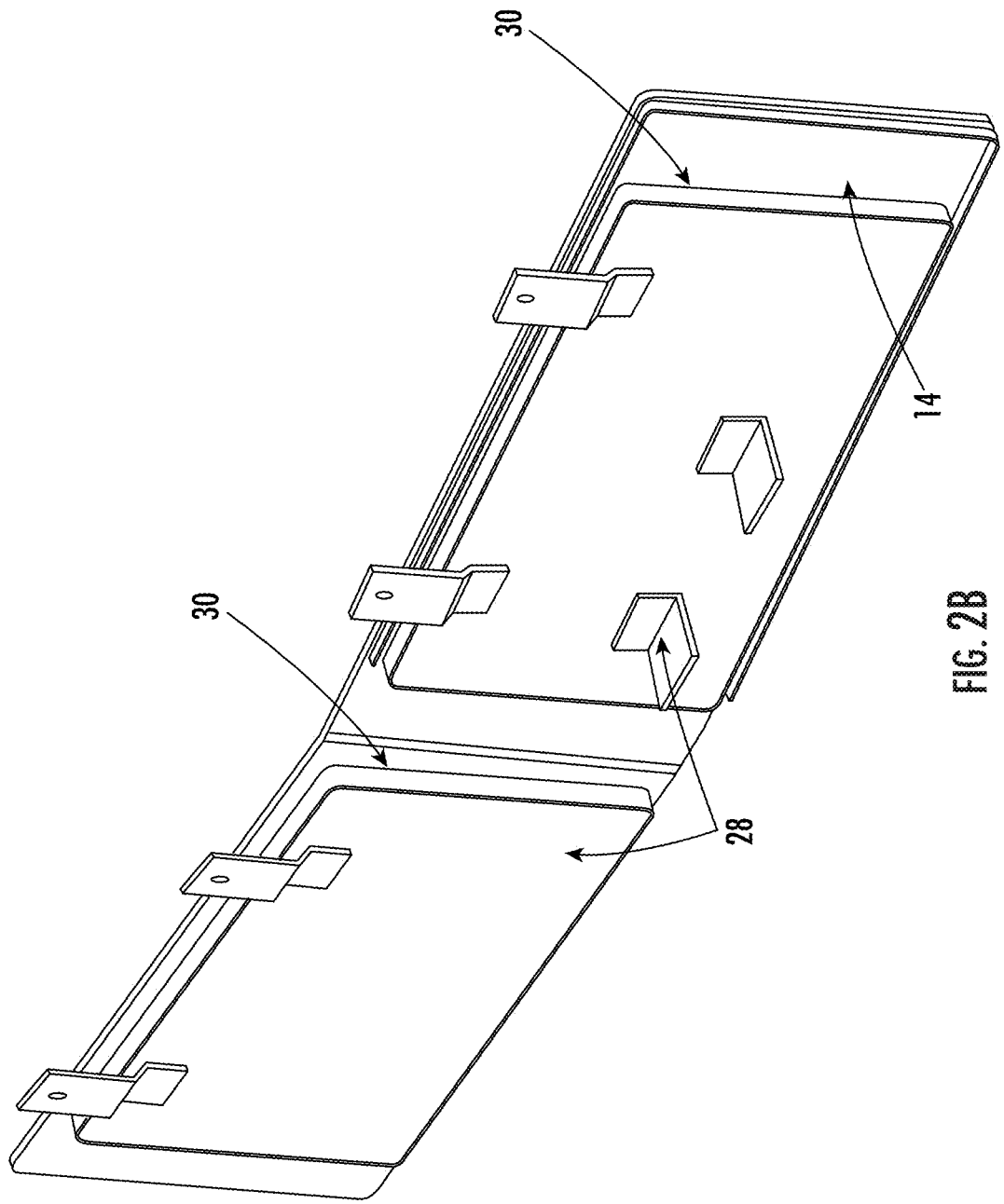

CURVED GLASS ARTICLES INCLUDING A BUMPER PIECE CONFIGURED TO RELOCATE BENDING MOMENT FROM DISPLAY REGION AND METHOD OF MANUFACTURING SAME

CROSS-REFERENCE TO RELATED APPLICATIONS

This application claims the benefit of priority under 35 U.S.C. § 119 of U.S. Provisional Application Ser. No. 62/912,121 filed on Oct. 8, 2019 the content of which is relied upon and incorporated herein by reference in its entirety.

BACKGROUND

The disclosure relates to vehicle interior systems including glass and methods for forming the same, and more particularly to vehicle interior systems including a curved glass article with a cold-formed or cold-bent cover glass and methods for forming the same.

Vehicle interiors include curved surfaces and can incorporate displays in such curved surfaces. The materials used to form such curved surfaces are typically limited to polymers, which do not exhibit the durability and optical performance as glass. As such, curved glass sheets are desirable, especially when used as covers for displays. Existing methods of forming such curved glass sheets, such as thermal forming, have drawbacks including high cost, optical distortion, and surface marking. Accordingly, Applicant has identified a need for vehicle interior systems that can incorporate a curved glass sheet in a cost-effective manner and without problems typically associated with glass thermal forming processes.

SUMMARY

According to an aspect, embodiments of the disclosure relate to a curved glass article. The article includes a glass sheet having a first major surface and a second major surface opposite to the first major surface. The second major surface defines a first curvature of the glass sheet. The article also includes a display bonded to the second major surface of the glass sheet using an optically clear adhesive. The display has a perimeter with a display edge proximal to the first curvature. The article also includes a bumper piece disposed at least along the display edge proximal to the first curvature and a frame bonded to the second surface of the glass sheet using an adhesive. The frame is disposed around the display and over the bumper piece. In the article, the adhesive has a first modulus and the bumper piece has a second modulus that is greater than the first modulus.

According to another aspect, embodiments of the disclosure relate to a method of forming a curved glass article. In the method, a glass sheet having a first major surface and a second major surface opposite to the first major surface is provided. A display is bonded to the second major surface of the glass sheet using an optically clear adhesive. A bumper piece is placed on the second major surface of the glass sheet along an edge of the display. The bumper piece has a first modulus. The glass sheet is bent at a temperature less that a glass transition temperature of the glass sheet to form a curvature. An adhesive having a second modulus is applied to the second major surface of the glass sheet around the display. A frame is bonded to the second major surface of the glass sheet via the adhesive, such that, upon curing of the adhesive, the frame maintains the curvature of the glass sheet. In the curved glass article, the bumper piece is located between the edge of the display and the curvature, and the first modulus is greater than the second modulus.

According to still another aspect, embodiments of the disclosure relate to a curved glass article. The article includes a glass sheet having a first major surface and a second major surface opposite to the first major surface. The second major surface defines a first curvature of the glass sheet. The article also includes a display bonded to the second major surface of the glass sheet using an optically clear adhesive, and the display has a perimeter with a display edge proximal to the first curvature. The article further includes a bumper piece disposed at least along the display edge proximal to the first curvature, and a frame bonded to the second surface of the glass sheet using an adhesive. The frame is disposed around the display and over the bumper piece. The display defines a display region of the glass sheet, and, in the display region, the curved glass article has a dark state uniformity of at least 90%.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 2A and 2B depict a curved glass article, according to an exemplary embodiment.

9 depicts the deflection of a glass sheet having a rectangular bumper piece, according to exemplary embodiments.

Figure 10:
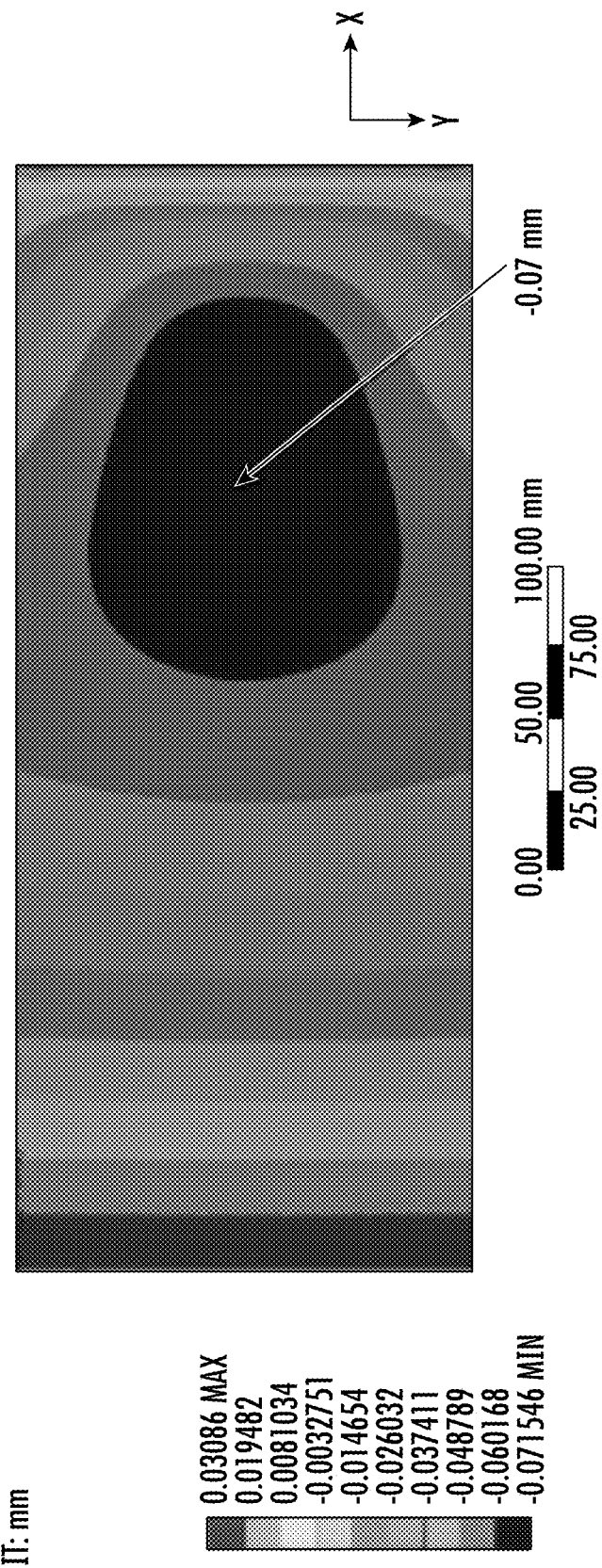

FIG. 10 depicts the deflection of a glass sheet having a wedge-shaped bumper piece, according to an exemplary embodiment.

Figure 11:
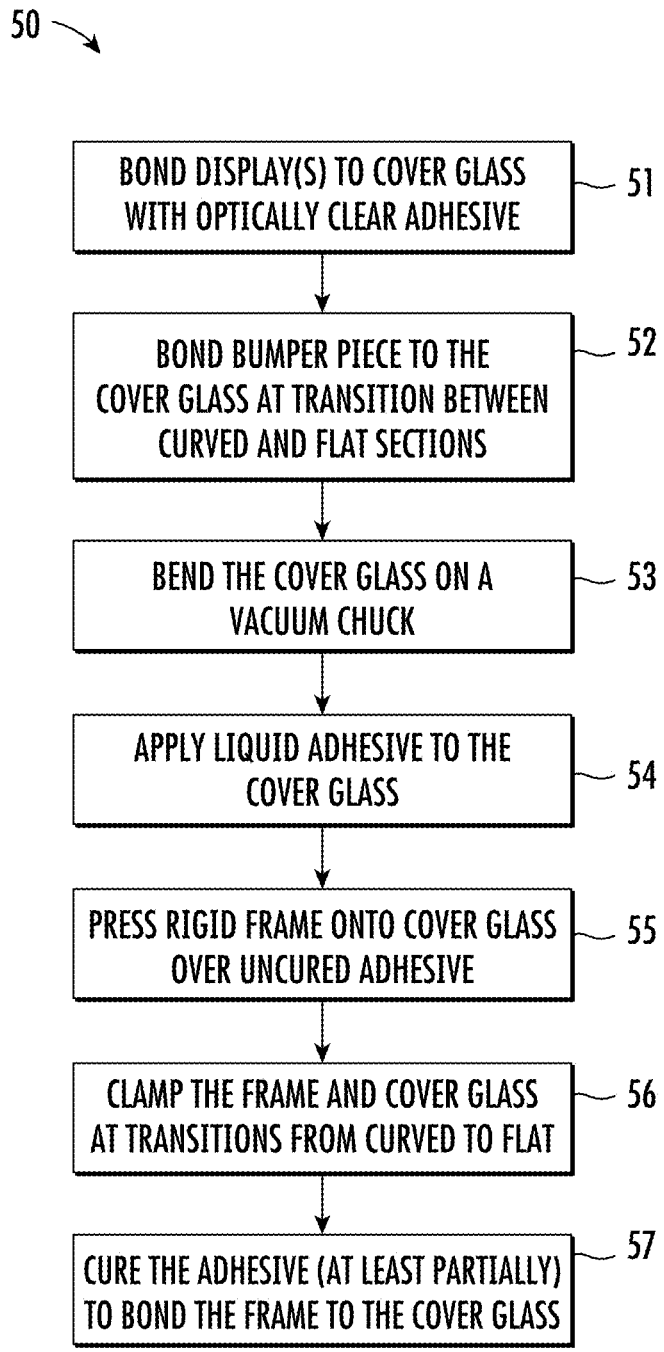

FIG. 11 depicts a flow diagram of a method of manufacturing a curved glass article, according to an exemplary embodiment.

Figure 12:
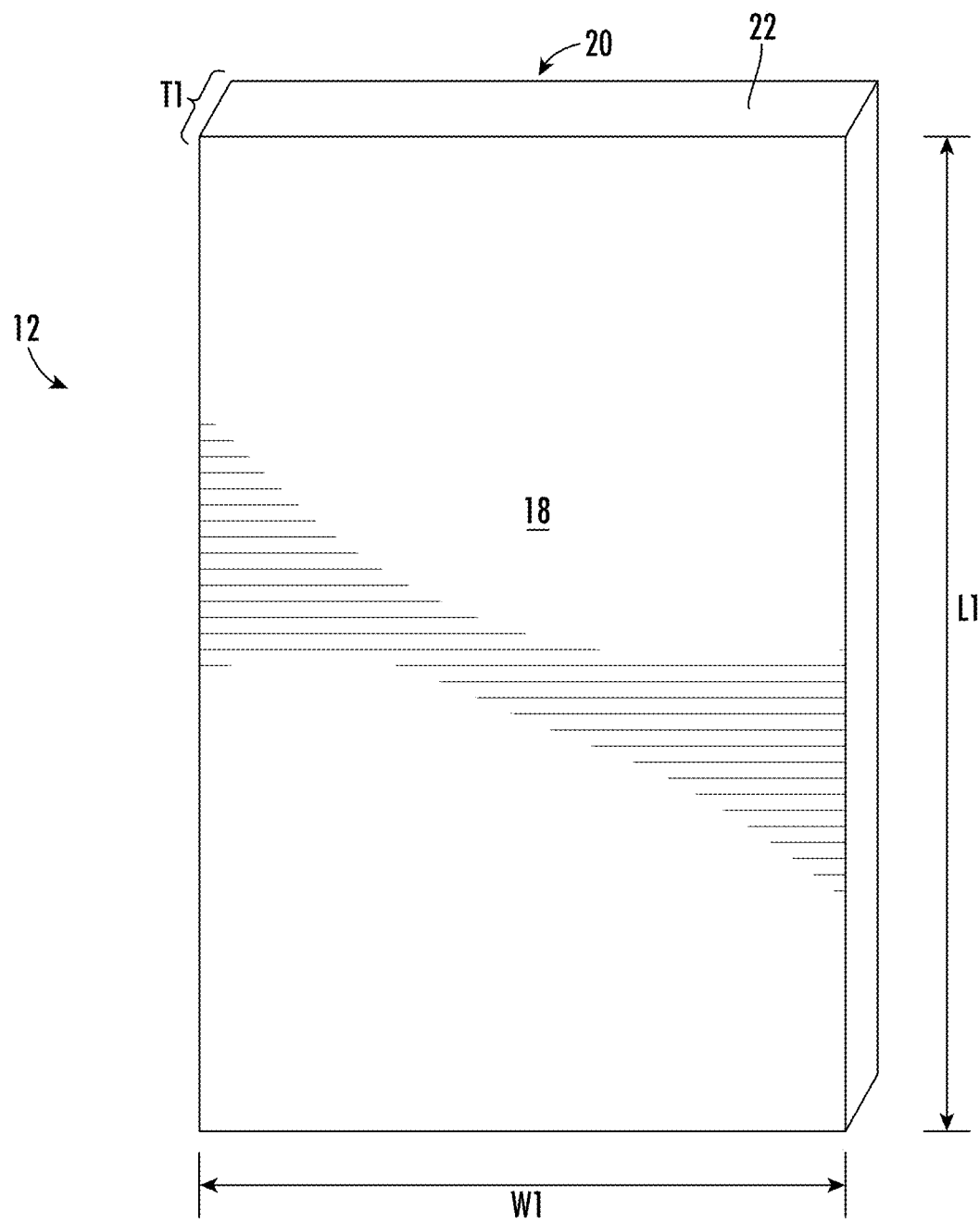

FIG. 12 depicts a glass sheet with exemplary dimensions, according to an exemplary embodiment.

DETAILED DESCRIPTION

Reference will now be made in detail to various embodiments, examples of which are illustrated in the accompanying drawings. In general, a vehicle interior system may include a variety of different curved surfaces that are designed to be transparent, such as curved display surfaces, and the present disclosure provides articles and methods for forming these curved surfaces from a glass material. Forming curved vehicle surfaces from a glass material provides a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials.

Accordingly, as will be discussed in more detail below, Applicant has developed a curved glass article for a vehicle interior display and related manufacturing processes that provide an efficient and cost effective way to form such an article utilizing a cold-bent glass sheet.

In particular embodiments, the curved glass article has reduced Mura defects resulting from deflections of the glass sheet in the display regions of the glass article. In particular, conventional glass articles are formed in a manner that creates a bending moment at the edge of a display bonded to the glass sheet. Because of the bending moment, the glass sheet deflects at the edge of the display, leading to Mura (i.e., non-uniform brightness or darkness across the screen). According to the present disclosure, the bending moment is moved from the edge of the display by incorporation of a bumper piece having a relatively high modulus in the adhesive layer. As will be discussed more fully below, the high-modulus bumper piece reduces deflection in the display region, thereby substantially reducing or eliminating Mura defects associated with the location of the bending moment. Various aspects and advantages of the curved glass article and method of forming same will be described in relation to the exemplary embodiments described herein and shown in the figures.

Figure 1:
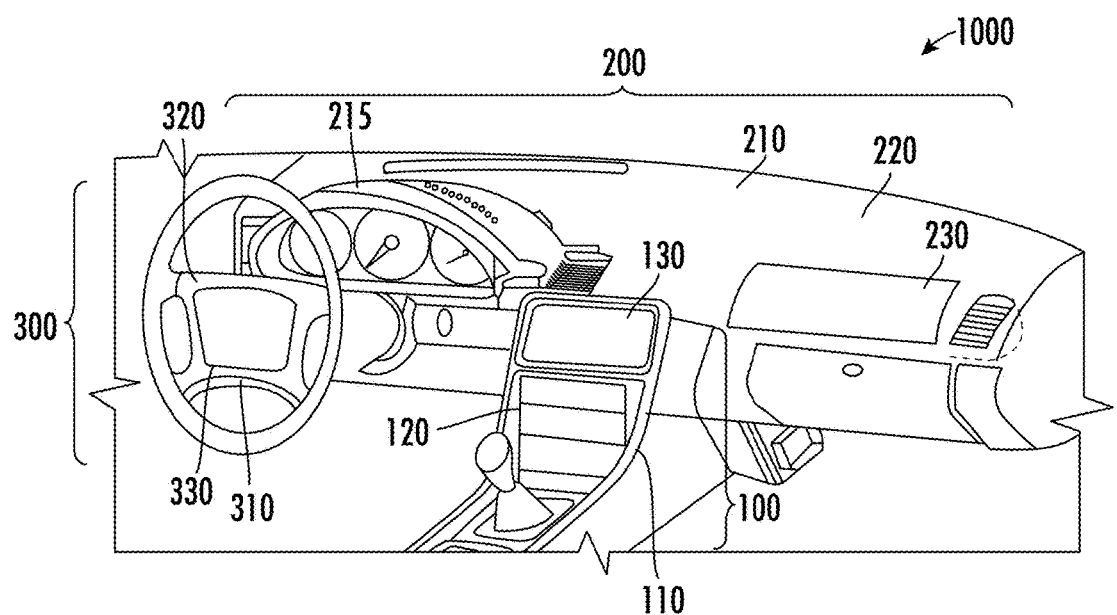
FIG. 1 is a perspective view of a vehicle interior with vehicle interior systems, according to exemplary embodiments.

FIG. 1 shows an exemplary vehicle interior 1000 that includes three different embodiments of a vehicle interior system 100, 200, 300. Vehicle interior system 100 includes a frame, shown as center console base 110, with a curved surface 120 including a curved display 130. Vehicle interior system 200 includes a frame, shown as dashboard base 210, with a curved surface 220 including a curved display 230. The dashboard base 210 typically includes an instrument panel 215 which may also include a curved display. Vehicle interior system 300 includes a frame, shown as steering wheel base 310, with a curved surface 320 and a curved display 330. In one or more embodiments, the vehicle interior system includes a frame that is an arm rest, a pillar, a seat back, a floor board, a headrest, a door panel, or any portion of the interior of a vehicle that includes a curved surface. In other embodiments, the frame is a portion of a housing for a free-standing display (i.e., a display that is not permanently connected to a portion of the vehicle). In embodiments, the display 130, 230, 330 may be at least one of a light-emitting diode display, an organic light-emitting diode display, a plasma display, or a liquid crystal display bonded to a rear surface (e.g., using an optically clear adhesive) of a curved glass article 10 disclosed herein.

The embodiments of the curved glass article described herein can be used in each of vehicle interior systems 100, 200 and 300, among others. In particular, the curved glass articles discussed herein may be used as curved cover glasses for any of the curved display embodiments discussed herein, including for use in vehicle interior systems 100, 200 and/or 300. In embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront functionality.

Figure 2A:
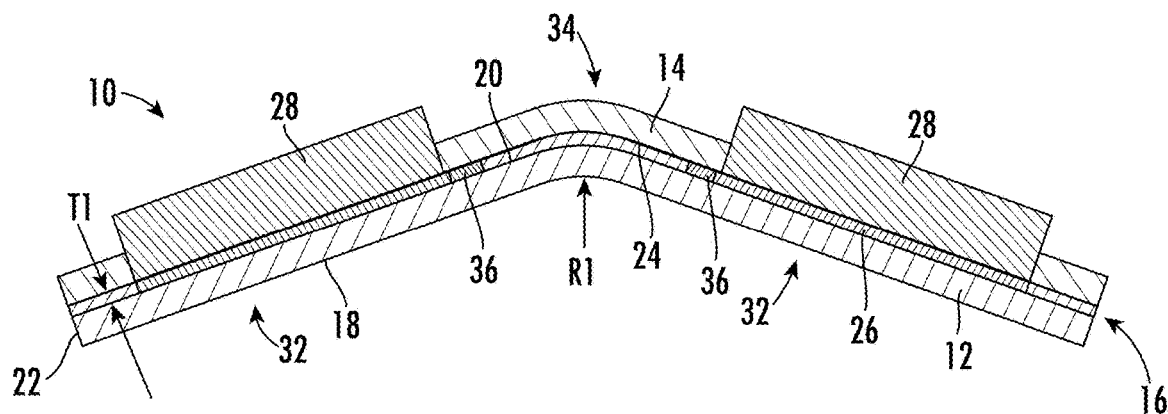

FIG. 2A depicts a curved glass article 10, such as the cover glass for curved display 130, 230, 330 according to exemplary embodiments. It should be understood that, while FIG. 2A is described in terms of forming curved display 130, 230, 330, the curved glass article 10 of FIG. 2A may be used in any suitable curved glass application, including any curved glass component of any of the vehicle interior systems of FIG. 1 or other curved glass surfaces of the vehicle interior 1000. Such curved glass components could be display or non-display regions, e.g., a flat display area and a curved non-display area, curved displays, and curved display and curved non-display areas.

FIG. 2A depicts a cross-sectional view of a curved glass article 10 according to an exemplary embodiment. As shown in FIG. 2A, the curved glass article 10 includes a curved glass sheet 12 bonded to a frame 14 via an adhesive layer 16. The glass sheet 12 has a first major surface 18 and a second major surface 20 opposite to the first major surface 18. The distance between the first major surface 18 and the second major surface 20 define a thickness T1 therebetween. Further, the first major surface 18 and the second major surface 20 are connected by a minor surface 22 that extends around the periphery of the glass sheet 12.

The glass sheet 12 has a curved shape such that first major surface 18 and second major surface 20 each include at least one curved section having a radius of curvature R1. In embodiments, R1 is between 30 mm and 5 m. Further, in embodiments, the glass sheet 12 has a thickness T1 (e.g., an average thickness measured between surfaces 18, 20) that is in a range from 0.05 mm to 2 mm. In specific embodiments, T1 is less than or equal to 1.5 mm and in more specific embodiments, T1 is 0.3 mm to 1.3 mm. Applicant has found that such thin glass sheets can be cold formed to a variety of curved shapes (including the relatively tight radii of curvature discussed herein) utilizing cold forming without breakage while at the same time providing for a high quality cover layer for a variety of vehicle interior applications. In addition, such thin glass sheets 12 may deform more readily, which could potentially compensate for shape mismatches and gaps that may exist relative to the frame 14.

In various embodiments, first major surface 18 and/or the second major surface 20 of glass sheet 12 includes one or more surface treatments or layers. The surface treatment may cover at least a portion of the first major surface 18 and/or second major surface 20. Exemplary surface treatments include anti-glare surfaces/coatings, anti-reflective surfaces/coatings, and an easy-to-clean surface coating/treatment. In one or more embodiments, at least a portion of the first major surface 18 and/or the second major surface 20 may include any one, any two or all three of an anti-glare surface, an anti-reflective surface, and easy-to-clean coating/treatment. For example, first major surface 18 may include an anti-glare surface and second major surface 20 may include an anti-reflective surface. In another example, first major surface 18 includes an anti-reflective surface and second major surface 20 includes an anti-glare surface. In yet another example, the first major surface 18 comprises the easy-to-clean coating, and the second major surface 20 includes either one of or both the anti-glare surface and the anti-reflective surface. In one or more embodiments, the anti-glare surface includes an etched surface. In one or more embodiments, the anti-reflective surface includes a multi-layer coating.

In embodiments, the glass sheet 12 may also include a pigment design on the first major surface 18 and/or second major surface 20. The pigment design may include any aesthetic design formed from a pigment (e.g., ink, paint and the like) and can include, e.g., a wood-grain design, a brushed metal design, a graphic design, a portrait, or a logo. The pigment design may be printed onto the glass sheet.

In general, glass sheet 12 is cold formed or cold bent to the desired curved shape via application of a bending force to the glass sheet 12 while it is situated on a chuck having a curved surface. Advantageously, it is easier to apply surface treatments to a flat glass sheet 12 prior to creating the curvature in the glass sheet 12, and cold-forming allows the treated glass sheet 12 to be bent without destroying the surface treatment (as compared to the tendency of high temperatures associated with hot-forming to destroy surface treatments, which requires surface treatments to be applied to the curved article in a more complicated process). In embodiments, the cold forming process is performed at a temperature less than the glass transition temperature of the glass sheet 12. In particular, the cold forming process may be performed at room temperature (e.g., about 20° C.) or a slightly elevated temperature, e.g., at 200° C. or less, 150° C. or less, 100° C. or less, or at 50° C. or less.

As shown in FIG. 2A, the adhesive layer 16 is disposed on the second major surface 20 of the glass sheet 12. The adhesive layer 16 includes a first adhesive 24 and a second adhesive 26. The first adhesive 24 bonds the frame 14 to the glass sheet 12, and the second adhesive 26 bonds one or more displays 28 to the second major surface 20 of the glass sheet 12. FIG. 2B depicts a rear view of the glass article 10 showing the two displays 28 bonded to the second major surface 20 of the glass sheet 12 with the frame 14 surrounding the displays 28. In particular, the frame 14 includes apertures 30 configured to accommodate the displays 28. In an embodiment, the first adhesive 24 is a structural adhesive, and the second adhesive 26 is an optically clear adhesive.

In embodiments, the first adhesive 24 provides long term strength after curing over the course of, e.g., about an hour at ambient temperature. In embodiments, exemplary adhesives for the first adhesive 24 include at least one of a toughened epoxy, a flexible epoxy, an acrylic, a silicone, a urethane, a polyurethane, or a silane modified polymer. In specific embodiments, the first adhesive 24 includes one or more toughened epoxies, such as EP21TDCHT-LO (available from Masterbond®, Hackensack, NJ), 3M™ Scotch-Weld™ Epoxy DP460 Off-White (available from 3M, St. Paul, MN). In other embodiments, the first adhesive 24 includes one or more flexible epoxies, such as Masterbond EP21TDC-2LO (available from Masterbond®, Hackensack, NJ), 3M™ Scotch-Weld™ Epoxy 2216 B/A Gray (available from 3M, St. Paul, MN), and 3M™ Scotch-Weld™ Epoxy DP125. In still other embodiments, the first adhesive 24 includes one or more acrylics, such as LORD® Adhesive 410/Accelerator 19 w/LORD® AP 134 primer, LORD® Adhesive 852/LORD® Accelerator 25 GB (both being available from LORD Corporation, Cary, NC), DELO PUR SJ9356 (available from DELO Industrial Adhesives, Windach, Germany), Loctite® AA4800, Loctite® HF8000. TEROSON® MS 9399, and TEROSON® MS 647-2C (these latter four being available from Henkel AG & Co. KGaA, Dusseldorf, Germany), among others. In yet other embodiments, the first adhesive 24 includes one or more urethanes, such as 3M™ Scotch-Weld™ Urethane DP640 Brown and 3M™ Scotch-Weld™ Urethane DP604, and in still further embodiments, the first adhesive 24 includes one or more silicones, such as Dow Corning® 995 (available from Dow Corning Corporation, Midland, MI). The second adhesive 26 may be any of a variety of suitable epoxies, urethanes, silicones, or acrylics.

In the embodiment depicted, there are two displays 28 provided on the second major surface 20 of the glass sheet 12. Further, in the embodiment depicted, the glass article 10 is V-shaped, having two flat sections 32 disposed on either side of a bend region 34. In other embodiments, the glass article 10 may be, for example, C-shaped (continuously curved bend region 34 between ends of the curved glass article 10), J-shaped (one flat section 32 and one bend region 34), or S-shaped (two bend regions 34 with opposite curvatures), among other possible configurations. Each display 28 may be any of a variety of suitable display types, such as liquid crystal display (LCD), light emitting diode (LED), organic LED (OLED), or a plasma display. Further, each display 28 may be a flat display or a curved display. Thus, the display 28 may be disposed in any of the flat sections 32 or bend regions 34 of the glass article 10. In the embodiment of FIG. 2A, the two displays 28 are each provided in a flat section 32 of the V-shaped glass article 10.

As mentioned above, disposed between the frame 14 and the glass sheet 12 is a bumper piece 36. As can be seen in FIG. 2A, the bumper piece 36 is within the adhesive layer 16. The bumper piece 36 is a region of material that is relatively stiffer (i.e., having a higher Young's modulus) than either the first adhesive 24 or the second adhesive 26. The bumper piece 36 is positioned proximal to the display 28 and to the transition between the flat section 32 and the curved region 34. In the embodiment to FIG. 2A, two bumper pieces 36 are provided for each display 28 and both transition between flat sections 32 and curved region 34.

Figure 3:
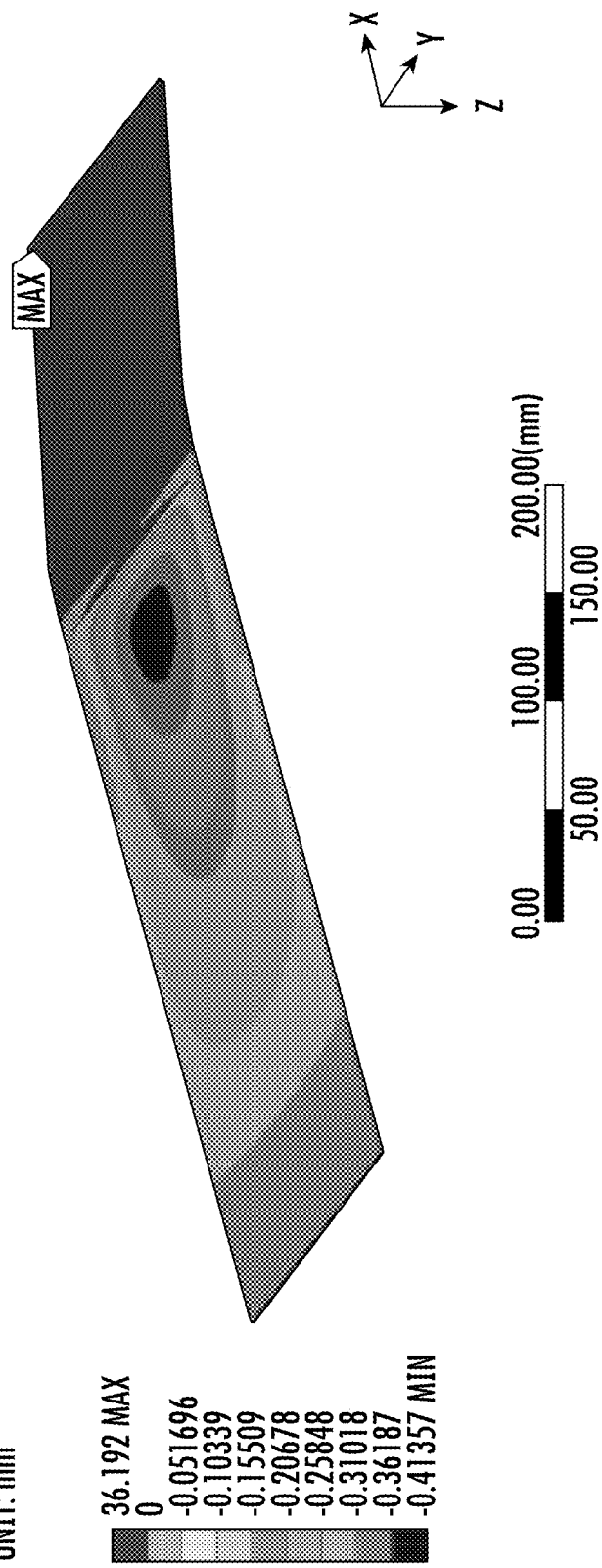
FIG. 3 depicts the deflection of the glass sheet of a conventional curved glass article.
Figure 4:
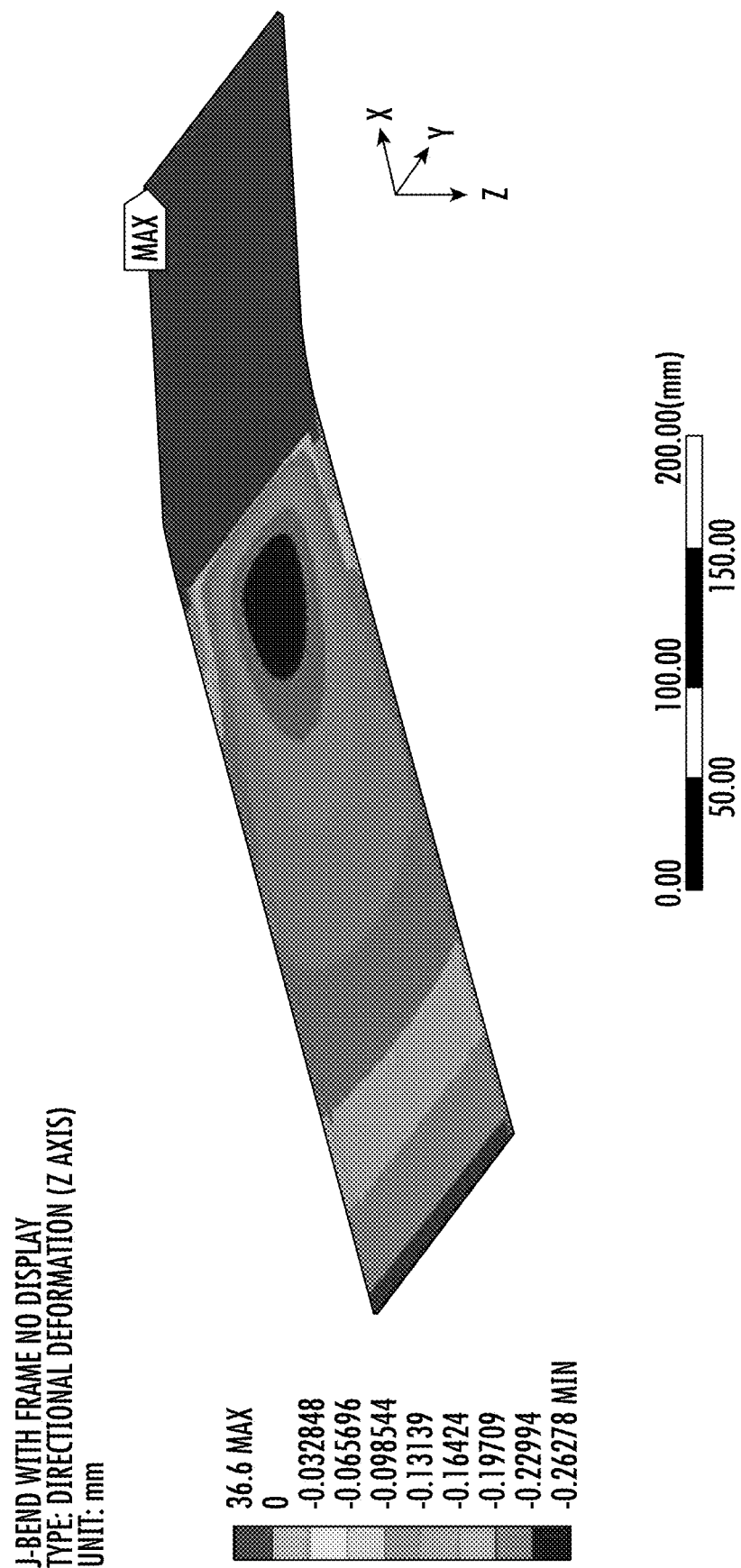
FIG. 4 depicts the deflection of the glass sheet of a curved glass article utilizing a relatively high modulus adhesive.

In conventional glass articles, the transition between curved regions and flat sections creates a bending moment that extends into the display area of the glass article, which creates deflection in the flat sections. In this way, the glass sheet is pulled away from the display at one end of the display, potentially creating distortions when viewing the display. FIG. 3 depicts the deflection in the flat section of a conventional J-shaped glass article. As can be seen in FIG. 3, the maximum deflection is about 0.41 mm. One way to address the deflection is to use an adhesive with a higher modulus to bond the glass sheet to the frame. Thus, as shown in FIG. 4, a glass article is provided in which the adhesive is 2.0 MPa (as opposed to the adhesive with a 0.5 MPa modulus in FIG. 2). FIG. 3 demonstrates that the deflection is reduced to 0.26 mm using the adhesive with a higher modulus. However, there are constraints that prevent simply increasing the modulus of the adhesive to further reduce deflection. For example, the adhesive must have a modulus below 2.0 MPa in order accommodate the differential in thermal expansion of the glass sheet and of the frame. Therefore, according to the present disclosure, one or more bumper pieces 36 are provided to move the bending moment away from the display area, substantially reducing or eliminating the deflection in the flat sections 32.

As mentioned, the bumper piece 36 is a relatively stiff material because applying the desired moment at the bumper piece 36 would otherwise be difficult with a relatively soft material as a result of the pressures required to bend the glass sheet 12 and the high strains allowed by soft materials. In embodiments, the bumper piece 36 is made from any of a variety of materials, including at least one of a thermoplastic, an elastomer, a ceramic, or a metal. For example, the bumper piece 36 may be a strip of an elastomeric material or a region of adhesive having a higher modulus than the first adhesive 24. Further, in embodiments, the bumper piece 36 may be integral with the frame 14. In embodiments, the bumper piece 36 is molded with, cast with, formed on, deposited on, or joined to the frame 14. Taking a metal frame 14 as an example, the metal frame 14 may be pressed or stamped in such a way that the bumper piece 36 is formed on a surface of the frame 14.

In general, the material of the bumper piece 36 is selected to have a modulus that is at least twice the modulus of the first adhesive 24. Thus, for example, the bumper piece 36 has a modulus of at least 4.0 MPa. Further, in embodiments, the bumper piece 36 has a modulus of no more than 500 MPa so as to avoid breaking the glass sheet 12 during bending. In embodiments, the bumper piece 36 has a modulus in the range of from 10 MPa to 400 MPa, more particularly from 20 MPa to 200 MPa. In embodiments, the bumper piece 36 is a rectangular strip extending along a line where the bending moment is desired to be applied. As shown in FIG. 2A, the bumper piece 36 is provided adjacent to a peripheral edge of the display 28. Further, in embodiments, the bumper piece 36 has a thickness that is substantially equal to the thickness of the rest of the adhesive layer 16, e.g., 0.5 mm to 4.0 mm (generally about 2.0 mm). However, in embodiments in which the bumper piece 36 is integral with the frame 14, the bumper piece 36 preferably has a thickness slightly less than the thickness of the adhesive layer 16 so that some adhesive (i.e., first adhesive 24) can be applied to the bumper piece 36 to join the bumper piece 36 to the glass sheet 12. Further, the bumper piece 36 has a width that is at least equal to the thickness of the adhesive layer 16. In embodiments, the width of the bumper piece 36 is from 1× to 5× the thickness of the adhesive layer 16, e.g., from 1.0 mm to 20.0 mm in embodiments. In other embodiments, the bumper piece 36 is wedge-shaped, having one longitudinal side being at a greater height than the other longitudinal side.

Figure 5:
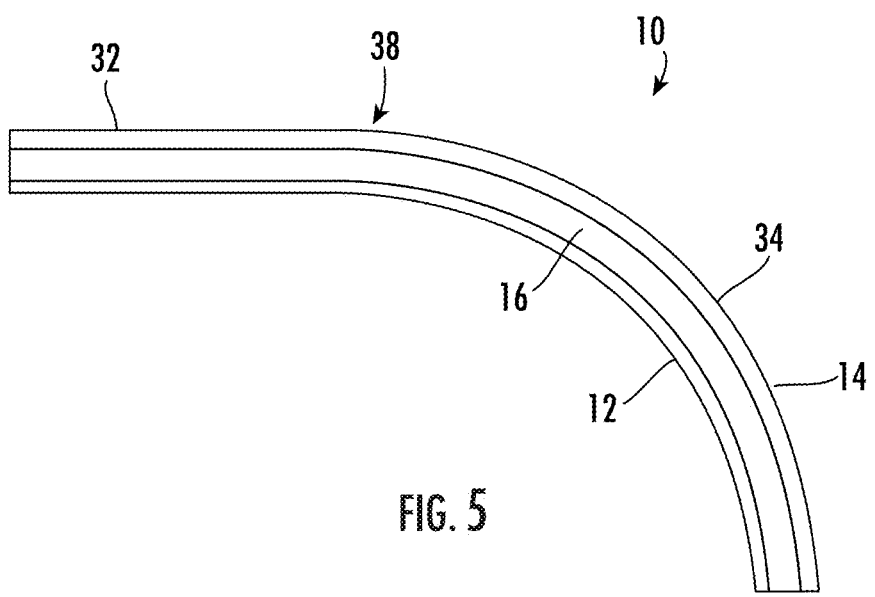
FIG. 5 depicts a transition between a flat and a bent section of a curved glass article, according to an exemplary embodiment.

FIG. 5 is a schematic depiction of a transition 38 between a curved region 34 and a flat section 32, such as might be found in the embodiment of the glass article 10 shown in FIG. 2A. According to the present disclosure, the bumper piece 36 is located along an edge of the display 28 that is proximal to the transition 38 so as to apply a bending moment proximal to the transition 38. By "proximal," it is meant that the bumper piece 36 is placed along the edge of the display that is closest to the transition 38. Advantageously, the stiffer bumper piece 36 only needs to be provided in a local region and other regions of the adhesive layer can remain as relatively soft, low-modulus materials (e.g., to accommodate differentials in thermal expansion between the glass sheet 12 and frame 14).

Figure 6:
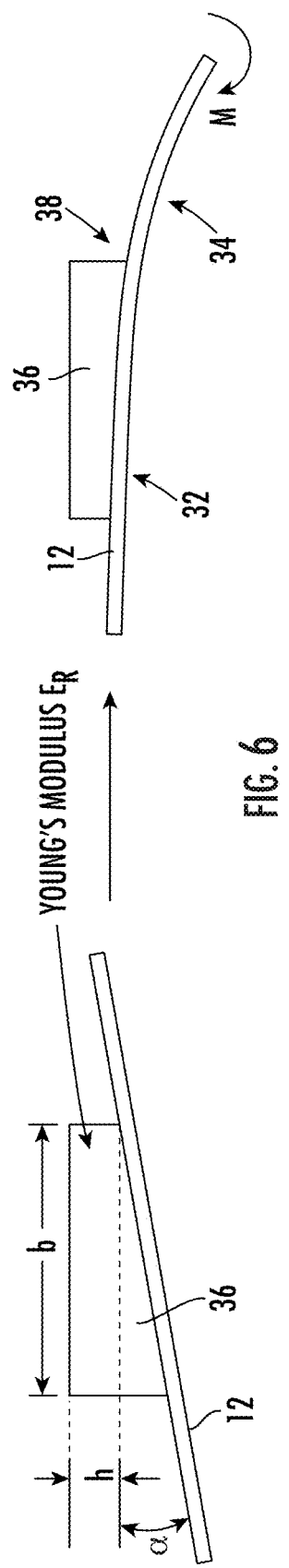
FIG. 6 depicts a glass sheet having a bumper piece and transitioning from flat to cold-formed, according to an exemplary embodiment.

FIG. 6 schematically depicts the bending moment created by a wedge-shaped bumper piece 36 as a result of bending. In the embodiment depicted, the bumper piece 36 has a width b of 5 mm, a height h of 2 mm, a wedge angle α of 1.16°, and a length L of 150 mm. The material from which the bumper piece 36 is made is an elastomer having a Young's modulus of 20 MPa. The bending moment M can be calculated according to the following formula:

$$M = \frac{E_R b^3 \tan(\alpha) L}{3h}$$

For a rectangular bumper piece 36, the moment M is still described by the formula, but the wedge angle α will be negative because the rectangular bumper piece 36 will change from flat prior to bending to wedge-shaped after bending. Using the above formula, the bending moment M for the wedge-shaped bumper piece 36 shown in FIG. 6 was found to be 1268 Nmm. In embodiments, the bumper piece 36 creates a bending moment of at least 1000 Nmm. In other embodiments, the bumper piece 36 creates a bending moment of at least 1100 Nmm, and in still other embodiments, the bumper piece 36 creates a bending moment of at least 1200 Nmm. Per unit length, the bending moment (Nm/m) is given by the formula $E*T1^3/12R1$ in which the modulus E is the modulus of the glass sheet 12. For a glass sheet 12 having a thickness T1 of 2 mm and a radius R1 of 100 mm, the bending moment is 467 Nm/m. In embodiments, the bending moment per unit length is at least 450 Nm/m, at least 600 Nm/m, or at least 750 Nm/m. As can be seen in FIG. 6, upon bending the glass sheet 12, the side of the bumper piece 36 initially having the greater height is compressed to a height lower than the side that initially had the lesser height.

Figure 7:
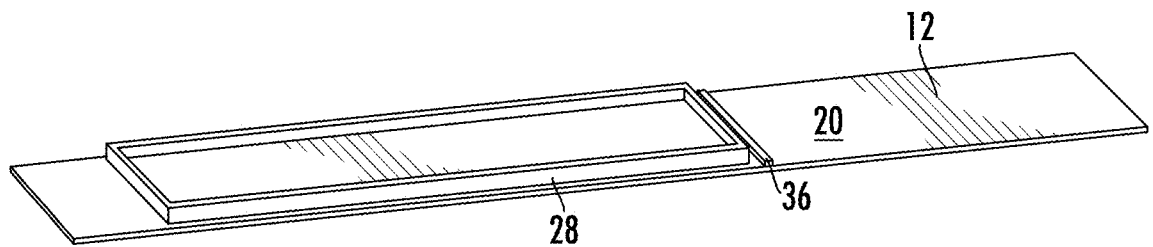
FIG. 7 depicts a glass article including a glass sheet with a display and bumper piece, according to an exemplary embodiment.
Figure 8:
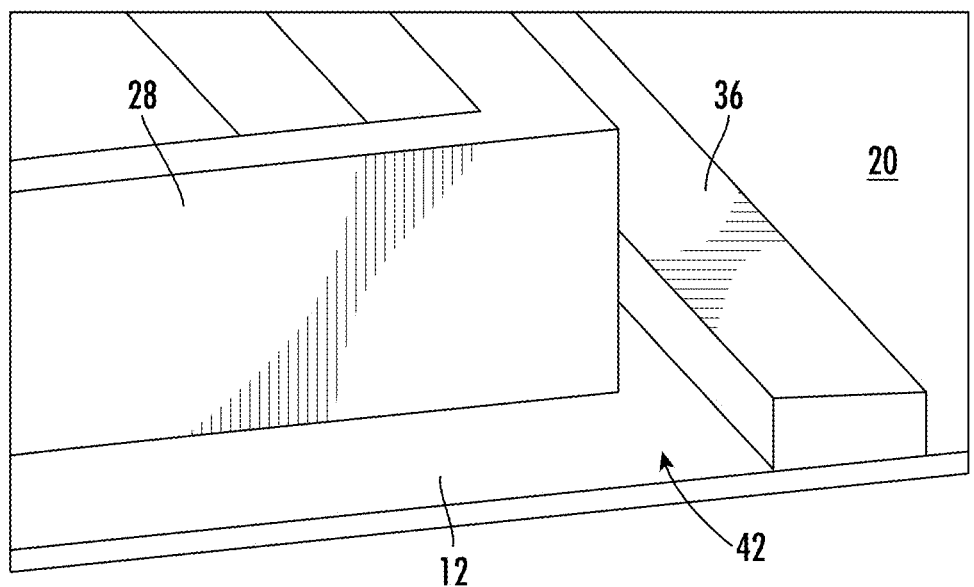
FIG. 8 depicts a close-up view of the glass article of FIG. 7, according to an exemplary embodiment.

FIG. 7 depicts the glass sheet 12 and wedge-shaped bumper piece 36 along with a display 28. As can be seen in FIG. 7, the bumper piece 36 is arranged proximal to a peripheral edge 40 of the display 28. In particular, the side of the bumper piece 36 having the greater height is arranged proximal to the peripheral edge 40. FIG. 8 shows a close-up view of the bumper piece 36 and display 28. Depending on how the glass article 10 is assembled, there may be a small gap 42 between the peripheral edge 40 of the display 28 and the bumper piece 26. Preferably, the gap 42 is minimized to no more than 5 mm.

Figure 9:
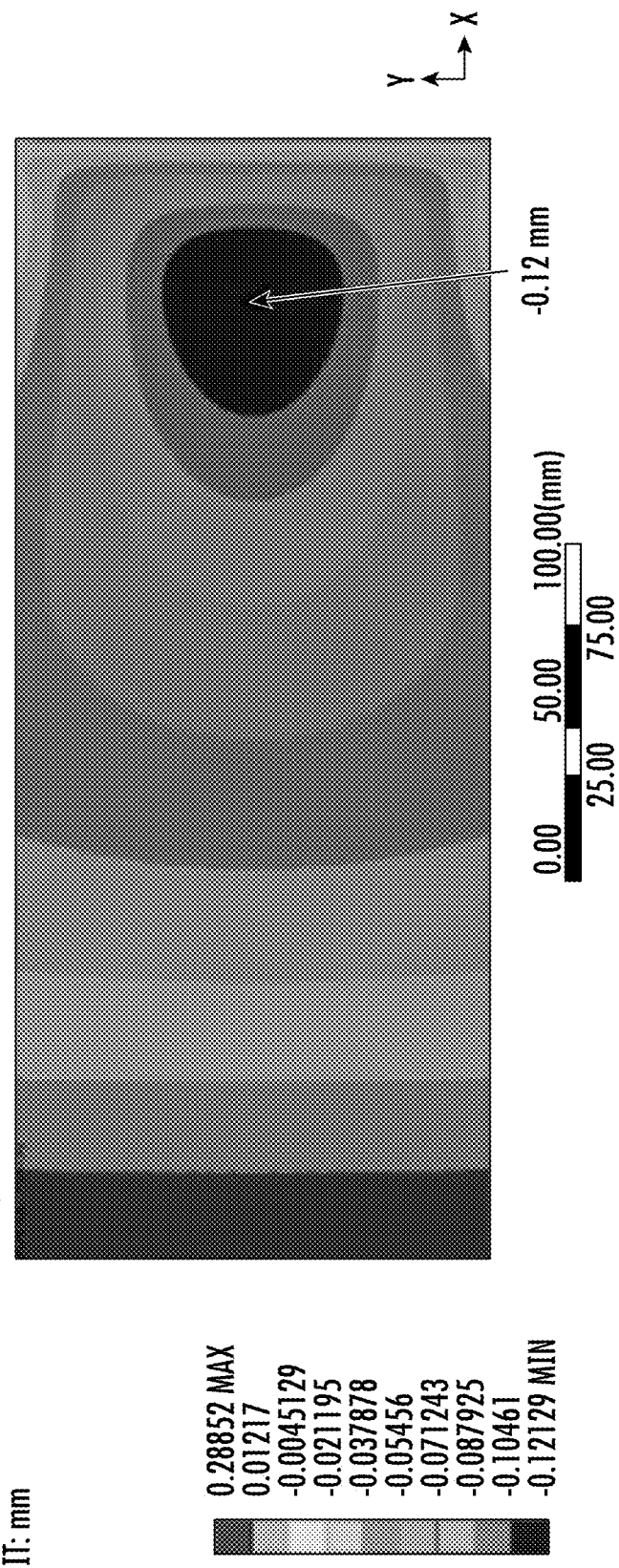

FIGS. 9 and 10 depict graphs of the deflection for glass articles 10 using the bumper pieces 36 as described. In particular, FIG. 9 considers a rectangular bumper piece 36 (i.e., α=0°), and FIG. 10 considers a wedge-shaped bumper piece 36 with a wedge angle α=0.5°. In both cases of FIGS. 9 and 10, the first adhesive 24 of the adhesive layer 16 had a modulus of 2.0 MPa. Further, in both cases of FIGS. 9 and 10, the bumper piece 26 had a modulus of 20 MPa, a width of 5.0 mm, and a height of 2.0 mm. As can be seen in FIG. 9, the maximum deflection was reduced to 0.12 mm from 0.26 mm from just using a higher modulus adhesive. FIG. 10 demonstrates that the maximum deflection was reduced even further to 0.07 mm using the wedge-shaped bumper piece 36. The deflection can be reduced further still by using a material having a modulus of more than 20 MPa for the bumper piece or by increasing the wedge angle (e.g., providing a wedge-shaped bumper piece 36 with a greater disparity in height between the sides of the bumper piece 36. In embodiments, the deflection of the glass sheet 12 from planar in the display region is no more than 0.20 mm, more particularly no more than 0.15 mm, and in particular 0.10 mm. Advantageously, the compression of the bumper piece 36 during cold-bending produces a substantially rectangular cross-section of the bumper piece 36 so that the adhesive layer 16 is not uneven across the second major surface 20 of the glass sheet.

FIG. 11 provides a flow diagram depicting a method 50 of preparing an embodiment of a glass article 10 as described herein. In a first step 51, one or more displays 28 are bonded to the second major surface 20 of the glass sheet 12 using the second adhesive 26 (i.e., an optically clear adhesive). In a second step 52, the bumper piece is bonded to the second major surface 20 of the glass sheet 12 adjacent to a peripheral edge 40 of a display 28 and to a transition 38 between a flat section 32 and a curved region 34. However, in other embodiments, the bumper piece 36 could instead be attached to the frame 14 (if the bumper piece 36 is not integral with the frame 14). Thereafter, in a third step 53, the glass sheet 12 is cold-formed on a chuck, e.g., using vacuum forming techniques. In a fourth step 54, the first adhesive 24 is applied to the second major surface 20. However, in other embodiments, the first adhesive 24 could instead be applied to the frame 14. In embodiments, the first adhesive 24 is a liquid structural adhesive. In a fifth step 55, the frame 14 is pressed onto the glass sheet 12 over the adhesive layer 16. The frame 14 is a rigid material (such as a metal, plastic, ceramic, glass, or glass-ceramic) in which apertures 30 for the display(s) 28 are formed. Thus, as the frame 14 is pressed onto the glass sheet 12, the frame 14 will be disposed around the displays 28. Further, the action of pressing the frame 14 onto the glass sheet 12 causes the uncured first adhesive 24 to spread, creating a substantially uniformly thick adhesive layer 16. In a sixth step 56, the frame 14 is clamped in place over the glass sheet 12, and in a seventh step 57, the first adhesive 24 is allowed to cured at least partially while the glass sheet 12 is still vacuumed to the chuck. In embodiments, the first adhesive 24 fully cures while on the chuck, and in other embodiments, the first adhesive 24 only partially cures while the glass article 10 is on the chuck. For example, upon reaching a particular cure strength, the glass article 10 may be removed from the chuck while the frame 14 remains clamped to the glass sheet 12 so that the second adhesive can fully cure off the processing line. Upon reaching full cure strength, the clamps are removed, and the glass article 10 is finished.

By providing flat sections 32 for bonding the display 28, Mura defects can be substantially reduced or eliminated from glass articles 10. For displays having contrast ratios of 5000, glass deflection in conventional glass articles can reduce dark state uniformity from 100% to 73%. Through the use of a relatively high modulus bumper piece 36, deflection of the glass sheet 12 in flat sections 32 can be reduced to the point of providing at least 90% dark state uniformity, at least 95% dark state uniformity, or even up to 100% dark state uniformity. As used herein, dark state uniformity (%) is determined by the formula $1/(1+CR*LL)*100$, wherein CR is contrast ratio and LL is the brightness ratio of the brightest spot to the background. In measurements, the brightest spot is determined by the average intensity of a bright spot.

While the examples and figures depict glass articles 10 having configurations that include flat sections 32 and curved regions 24, continuously curved glass articles 10 (such as C-shaped or S-shaped glass articles) can also benefit from the inclusion of a bumper piece 36 to create a bending moment in a desired location. Glass articles 10 with continuously curved glass sheets 12 typically have much higher radii of curvature than glass articles 10 with flat sections 32, which lowers the moments required to create bending in the glass sheet 12 and lowers the requirements on the first adhesive 24 bonding the glass sheet 12 to the frame 14. Nevertheless, even continuously curved glass articles 10 can benefit from transferring the bending moment outside of display areas through the use of the disclosed bumper piece 36.

In various embodiments, glass sheet 12 is formed from a strengthened glass sheet (e.g., a thermally strengthened glass material, a chemically strengthened glass sheet, etc.) In such embodiments, when glass sheet 12 is formed from a strengthened glass material, first major surface 18 and second major surface 20 are under compressive stress, and thus second major surface 20 can experience greater tensile stress during bending to the convex shape without risking fracture. This allows for strengthened glass sheet 12 to conform to more tightly curved surfaces.

A feature of a cold-formed glass sheet 12 is an asymmetric surface compressive between the first major surface 18 and the second major surface 20 once the glass sheet 12 has been bent to the curved shape. In such embodiments, prior to the cold-forming process or being cold-formed, the respective compressive stresses in the first major surface 18 and the second major surface 20 of glass sheet 12 are substantially equal. After cold-forming, the compressive stress on concave first major surface 18 increases such that the compressive stress on the first major surface 18 is greater after cold-forming than before cold-forming. In contrast, convex second major surface 20 experiences tensile stresses during bending causing a net decrease in surface compressive stress on the second major surface 20, such that the compressive stress in the second major surface 20 following bending is less than the compressive stress in the second major surface 20 when the glass sheet is flat.

As noted above, in addition to providing processing advantages such as eliminating expensive and/or slow heating steps, the cold-forming processes discussed herein are believed to generate curved glass articles with a variety of properties that are superior to hot-formed glass articles, particularly for vehicle interior or display cover glass applications. For example, Applicant believes that, for at least some glass materials, heating during hot-forming processes decreases optical properties of curved glass sheets, and thus, the curved glass sheets formed utilizing the cold-bending processes/systems discussed herein provide for both curved glass shapes along with improved optical qualities not believed achievable with hot-bending processes.

Further, many glass surface treatments (e.g., anti-glare coatings, anti-reflective coatings, easy-to-clean coating, etc.) are applied via deposition processes, such as sputtering processes that are typically ill-suited for coating curved glass articles. In addition, many surface treatments (e.g., anti-glare coatings, anti-reflective coatings, easy-to-clean coating, etc.) also are not able to survive the high temperatures associated with hot-bending processes. Thus, in particular embodiments discussed herein, one or more surface treatments are applied to the first major surface 18 and/or to the second major surface 20 of glass sheet 12 prior to cold-bending, and the glass sheet 12 including the surface treatment is bent to a curved shape as discussed herein. Thus, Applicant believes that the processes and systems discussed herein allow for bending of glass after one or more coating materials have been applied to the glass, in contrast to typical hot-forming processes.

In various embodiments, a cold-formed glass sheet 12 may have a compound curve including a major radius and a cross curvature. A complexly curved cold-formed glass sheet 12 may have a distinct radius of curvature in two independent directions. According to one or more embodiments, a complexly curved cold-formed glass sheet 12 may thus be characterized as having "cross curvature," where the cold-formed glass sheet 12 is curved along an axis (i.e., a first axis) that is parallel to a given dimension and also curved along an axis (i.e., a second axis) that is perpendicular to the same dimension. The curvature of the cold-formed glass sheet and the curved display can be even more complex when a significant minimum radius is combined with a significant cross curvature, and/or depth of bend. In various embodiments, glass sheet 12 can have more than two curved regions with the same or differing curved shapes. In some embodiments, glass sheet 12 can have one or more region having a curved shape with a variable radius of curvature.

Referring to FIG. 12, additional structural details of glass sheet 12 are shown and described. As noted above, glass sheet 12 has a thickness T1 that is substantially constant and is defined as a distance between the first major surface 18 and the second major surface 20. In various embodiments, T1 may refer to an average thickness or a maximum thickness of the glass sheet. In addition, glass sheet 12 includes a width W1 defined as a first maximum dimension of one of the first or second major surfaces 18, 20 orthogonal to the thickness T1, and a length L1 defined as a second maximum dimension of one of the first or second major surfaces 18 20 orthogonal to both the thickness and the width. In other embodiments, W1 and L1 may be the average width and the average length of glass sheet 12, respectively.

In various embodiments, thickness T1 is 2 mm or less and specifically is 0.3 mm to 1.5 mm. For example, thickness T1 may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the T1 falls within any one of the exact numerical ranges set forth in this paragraph.

In various embodiments, width W1 is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W1 falls within any one of the exact numerical ranges set forth in this paragraph.

In various embodiments, length L1 is in a range from about 5 cm to about 1500 cm, from about 50 cm to about 1500 cm, from about 100 cm to about 1500 cm, from about 150 cm to about 1500 cm, from about 200 cm to about 1500 cm, from about 250 cm to about 1500 cm, from about 300 cm to about 1500 cm, from about 350 cm to about 1500 cm, from about 400 cm to about 1500 cm, from about 450 cm to about 1500 cm, from about 500 cm to about 1500 cm, from about 550 cm to about 1500 cm, from about 600 cm to about 1500 cm, from about 650 cm to about 1500 cm, from about 650 cm to about 1500 cm, from about 700 cm to about 1500 cm, from about 750 cm to about 1500 cm, from about 800 cm to about 1500 cm, from about 850 cm to about 1500 cm, from about 900 cm to about 1500 cm, from about 950 cm to about 1500 cm, from about 1000 cm to about 1500 cm, from about 1050 cm to about 1500 cm, from about 1100 cm to about 1500 cm, from about 1150 cm to about 1500 cm, from about 1200 cm to about 1500 cm, from about 1250 cm to about 1500 cm, from about 1300 cm to about 1500 cm, from about 1350 cm to about 1500 cm, from about 1400 cm to about 1500 cm, or from about 1450 cm to about 1500 cm. In other embodiments, L1 falls within any one of the exact numerical ranges set forth in this paragraph.

In various embodiments, one or more radius of curvature (e.g., R1 shown in FIG. 2A) of glass sheet 12 is about 30 mm or greater. For example, R1 may be in a range from about 30 mm to about 5000 mm, from about 50 mm to about 5000 mm, from about 70 mm to about 5000 mm, from about 90 mm to about 5000 mm, from about 110 mm to about 5000 mm, from about 150 mm to about 5000 mm, from about 200 mm to about 5000 mm, from about 250 mm to about 5000 mm, from about 300 mm to about 5000 mm, from about 350 mm to about 5000 mm, from about 400 mm to about 5000 mm, from about 450 mm to about 5000 mm, from about 500 mm to about 5000 mm, from about 550 mm to about 5000 mm, from about 600 mm to about 5000 mm, from about 650 mm to about 5000 mm, from about 700 mm to about 5000 mm, from about 750 mm to about 5000 mm, from about 800 mm to about 5000 mm, from about 850 mm to about 5000 mm, from about 900 mm to about 5000 mm, from about 950 mm to about 5000 mm, from about 1000 mm to about 5000 mm, from about 1500 mm to about 5000 mm, from about 2000 mm to about 5000 mm, from about 2500 mm to about 5000 mm, from about 3000 mm to about 5000 mm, from about 3500 mm to about 5000 mm, from about 4000 mm to about 5000 mm, from about 4500 mm to about 5000 mm, from about 30 mm to about 4500 mm, from about 30 mm to about 4000 mm, from about 30 mm to about 3500 mm, from about 30 mm to about 3000 mm, from about 30 mm to about 2500 mm, from about 30 mm to about 2000 mm, from about 30 mm to about 1500 mm, from about 30 mm to about 1000 mm, from about 30 mm to about 950 mm, from about 30 mm to about 900 mm, from about 30 mm to about 850 mm, from about 30 mm to about 800 mm, from about 30 mm to about 750 mm, from about 30 mm to about 700 mm, from about 30 mm to about 650 mm, from about 30 mm to about 600 mm, from about 30 mm to about 550 mm, from about 30 mm to about 500 mm, from about 30 mm to about 450 mm, or from about 30 mm to about 400 mm. In other embodiments, R1 falls within any one of the exact numerical ranges set forth in this paragraph.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, glass sheet 12 may be strengthened. In one or more embodiments, glass sheet 12 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 12 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 12 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheets may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T1 of the glass sheet (as described herein). For example, in one or more embodiments, the DOC may be equal to or greater than about 0.05T1, equal to or greater than about 0.1T1, equal to or greater than about 0.11T1, equal to or greater than about 0.12T1, equal to or greater than about 0.13T1, equal to or greater than about 0.14T1, equal to or greater than about 0.15T1, equal to or greater than about 0.16T1, equal to or greater than about 0.17T1, equal to or greater than about 0.18T1, equal to or greater than about 0.19T1, equal to or greater than about 0.2T1, equal to or greater than about 0.21T1. In some embodiments, the DOC may be in a range from about 0.08T1 to about 0.25T1, from about 0.09T1 to about 0.25T1, from about 0.18T1 to about 0.25T1, from about 0.11T1 to about 0.25T1, from about 0.12T1 to about 0.25T1, from about 0.13T1 to about 0.25T1, from about 0.14T1 to about 0.25T1, from about 0.15T1 to about 0.25T1, from about 0.08T1 to about 0.24T1, from about 0.08T1 to about 0.23T1, from about 0.08T1 to about 0.22T1, from about 0.08T1 to about 0.21T1, from about 0.08T1 to about 0.2T1, from about 0.08T1 to about 0.19T1, from about 0.08T1 to about 0.18T1, from about 0.08T1 to about 0.17T1, from about 0.08T1 to about 0.16T1, or from about 0.08T1 to about 0.15T1. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm. In other embodiments, DOC falls within any one of the exact numerical ranges set forth in this paragraph.

In one or more embodiments, the strengthened glass sheet may have a CS (which may be found at the surface or a depth within the glass sheet) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass sheet may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass sheet 12 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes A12O3 in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO2$ may be included in the amounts otherwise disclosed herein. It should be understood, that while the preceding glass composition paragraphs express approximate ranges, in other embodiments, glass sheet 134 may be made from any glass composition falling with any one of the exact numerical ranges discussed above.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A curved glass article, comprising:
   a glass sheet having a first major surface and a second major surface opposite to the first major surface, wherein the second major surface defines a first curvature of the glass sheet along a length of the glass sheet;
   a display bonded to a flat section of the second major surface of the glass sheet using an optically clear adhesive, the display having a perimeter with a display edge proximal to the first curvature, the display edge spaced from the first curvature in a first direction parallel to the length of the glass sheet;
   a bumper piece disposed between the display edge and the first curvature, the bumper piece comprising one or more of an elastomeric material and an adhesive material; and
   a frame bonded to the second surface of the glass sheet using an adhesive, the frame being disposed around the display and over the bumper piece, the adhesive having a thickness defined between the frame and the glass sheet, wherein the bumper piece has a width in the first direction from 1× to 5× of the thickness of the adhesive;
   wherein the adhesive has a first modulus and the bumper piece has a second modulus, the second modulus being greater than the first modulus.

2. The curved glass article of claim 1, wherein, prior to bonding the frame to the second surface, the bumper piece has a first side with a first thickness proximal to the display and a second side with a second thickness proximal to the first curvature, the first thickness being greater than the second thickness, and wherein, after bonding the frame to the second surface, the first thickness of the first side of the bumper piece is no more that the second thickness of the second side of the bumper piece.

3. The curved glass article of claim 1, wherein the second modulus is at least 2.0 MPa.

4. The curved glass article of claim 1, wherein a cross-section of the bumper piece has thickness in a range of from 0.5 mm to 4.0 mm.

5. The curved glass article of claim 1, wherein a cross-section of the bumper piece has a width of from 1.0 mm to 20.0 mm.

6. The curved glass article of claim 1, wherein the adhesive is a first adhesive and wherein the bumper piece is a second adhesive, wherein the first adhesive and the second adhesive are components of an adhesive layer disposed between the frame and the second major surface.

7. The curved glass article of claim 1, wherein the bumper piece comprises an elastomer having a modulus of at least 20 MPa.

8. The curved glass article of claim 1, wherein, in a region where the display is bonded to the second surface, the glass sheet has a maximum deflection from planar of 0.20 mm.

9. The curved glass article of claim 1, further comprising a second display bonded to the second major surface of the glass sheet, wherein the display and the second display are located on opposite sides of the first curvature.

10. The curved glass article of claim 9, wherein the second display comprises a second perimeter having a second display edge proximal to the first curvature and wherein the article further comprises a second bumper piece disposed between the second display edge and the first curvature.

11. The curved glass article of claim 1, wherein the bumper piece is disposed between the frame and the glass sheet.

12. The curved glass article of claim 1, wherein the first curvature has a bend radius of at least 100 mm.

13. A vehicle interior system, comprising the curved glass article according to claim 1, wherein the vehicle interior system is at least one of a center console, an instrument panel, or a dashboard.

14. A curved glass article, comprising:
   a glass sheet having a first major surface and a second major surface opposite to the first major surface, a thickness defined as a distance between the first major surface and the second major surface, a width defined as a first maximum dimension of one of the first or second major surfaces orthogonal to the thickness, and a length defined as a second maximum dimension of one of the first or second major surfaces orthogonal to both the thickness and the width, wherein the second major surface defines a first curvature of the glass sheet along the length of the glass sheet;

a display bonded to the second major surface of the glass sheet using an optically clear adhesive, the display having a perimeter with a display edge proximal to the first curvature, the display edge spaced from the first curvature in a first direction parallel to the length of the glass sheet;

a bumper piece disposed only in a local region adjacent to the display edge proximal to the first curvature on one side and adjacent to a transition between a flat section of the glass sheet and the first curvature on an opposite side, the bumper piece comprising one or more of an elastomeric material, an adhesive material, and a non-reinforced plastic material; and a frame bonded to the second surface of the glass sheet using an adhesive, the frame being disposed around the display and over the bumper piece, wherein an entirety of the bumper piece is disposed between the display edge and the transition in the first direction;

wherein the display defines a display region of the glass sheet and wherein, in the display region, the curved glass article has a dark state uniformity of at least 90%.

15. The curved glass article of claim 14, wherein the display has a contrast ratio of at least 5000.

16. The curved glass article of claim 14, wherein the display is bonded to the second major surface of the glass sheet in a flat section and wherein, in the display region, the glass sheet has a deflection of less than 0.20 mm.

17. The curved glass article of claim 14, wherein the bumper piece creates a bending moment of at least 450 Nm/m outside of the display region.

18. The curved glass article of claim 14, wherein the bumper piece is wedge-shaped.

19. The curved glass article of claim 14, wherein the bumper piece has a modulus in a range from at least 20 MPa to no more than 2.0 MPa.

20. The curved glass article of claim 14, wherein the adhesive has a thickness defined between the frame and the glass sheet, and wherein the bumper piece has a width in the first direction from 1× to 5× of the thickness of the adhesive.

* * * * *